US007248292B2

(12) United States Patent
Shimakura

(10) Patent No.: US 7,248,292 B2
(45) Date of Patent: Jul. 24, 2007

(54) IMAGING DEVICE WITH WORLD STANDARD TIME CALCULATION AND THE ABILITY TO TRANSMIT SAID CALCULATED TIME INFORMATION

(75) Inventor: Hideaki Shimakura, Tokyo (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 10/332,563

(22) PCT Filed: May 9, 2002

(86) PCT No.: PCT/JP02/04517

§ 371 (c)(1),
(2), (4) Date: Jun. 9, 2003

(87) PCT Pub. No.: WO02/093274

PCT Pub. Date: Nov. 21, 2002

(65) Prior Publication Data

US 2003/0193583 A1 Oct. 16, 2003

(30) Foreign Application Priority Data

May 11, 2001 (JP) ............................ 2001-141043

(51) Int. Cl.
*H04N 5/262* (2006.01)

(52) U.S. Cl. ................ 348/239; 348/14.03; 348/231.5; 348/211.1

(58) Field of Classification Search ............. 348/14.03, 348/231.5, 211.1, 211.3, 333.01
See application file for complete search history.

(56) References Cited

U.S. PATENT DOCUMENTS 5,258,805 A * 11/1993 Aoki et al. ................. 396/292
5,490,122 A 2/1996 Kojima
5,933,625 A * 8/1999 Sugiyama .................. 713/503
6,246,702 B1 * 6/2001 Fellman et al. ............. 370/503
6,795,097 B1 * 9/2004 Yamaguchi et al. ........ 715/810

FOREIGN PATENT DOCUMENTS

DE 4226645 2/1994

(Continued)

OTHER PUBLICATIONS

Patent Abstracts of Japan, vol. 017, No. 290 (P-1549), Jun. 3, 1993 & JP 05 019071 A (Sony Corp), Jan. 26, 1993 (Jan. 6, 1993).

*Primary Examiner*—David Ometz
*Assistant Examiner*—Usman Khan
(74) *Attorney, Agent, or Firm*—Frommer Lawrence & Haug LLP; William S. Frommer; Thomas F. Presson

(57) ABSTRACT

The present invention relates to video recording and playback apparatuses in which a video camera directly accesses a server via a network and can therefore send and receive data. A network access program 26*c* stored in a storage unit 26 controls a GMT program 26*b*; adds time-difference information for each area stored in area information 26*a*, which is stored in a RAM 24*c* built into a microcomputer 24, and information indicating whether or not summertime is in effect; and, based on time information generated by a real-time clock, which is set using date and time setting processing, calculates World Standard Time, that is to say, Greenwich Mean Time. The present invention can be adapted to video cameras, for example.

10 Claims, 33 Drawing Sheets

FOREIGN PATENT DOCUMENTS

| | | | |
|---|---|---|---|
| DE | 197 50 883 | A1 | 5/1999 |
| EP | 0 418 012 | | 3/1991 |
| EP | 0545345 | | 6/1993 |
| EP | 0 810 509 | | 12/1997 |
| GB | 2 234 616 | | 2/1991 |
| JP | 61-157975 | | 7/1986 |
| JP | 4-105093 | | 4/1992 |
| JP | 4-359185 | | 12/1992 |
| JP | 9-26489 | | 1/1997 |
| JP | 9-282383 | | 10/1997 |
| JP | 10-3386 | | 1/1998 |
| JP | 10-31532 | | 2/1998 |
| JP | 11-153679 | | 6/1999 |
| JP | 11-275494 | | 10/1999 |
| JP | 2000 261753 | | 9/2000 |
| JP | 2000 331462 | | 11/2000 |
| JP | 2001-197169 | | 7/2001 |
| WO | WO 97/22047 | | 6/1997 |

* cited by examiner

IMAGING DEVICE WITH WORLD STANDARD TIME CALCULATION AND THE ABILITY TO TRANSMIT SAID CALCULATED TIME INFORMATION

TECHNICAL FIELD

The present invention relates to information processing apparatuses. In particular, the present invention relates to an information processing apparatus in which time information set in the information processing apparatus, which is provided with an imaging function, such as a video camera and so forth, is added, and it is possible to obtain World Standard Time (GMT: Greenwich Mean Time) based on area information and summertime information.

BACKGROUND ART

A function for setting the time is provided in electronic devices having an imaging function, as typified by video cameras.

In video cameras, not only is the time set by this time setting function displayed as a simple clock, but it is also recorded together with the captured images. Accordingly, management of the captured images can be simplified, and it can be used for a timer function and so on.

Recently, electronic devices for portable use can be allowed to access a server via a network by including a built-in communication function or by connecting a communication apparatus such as a mobile telephone and so forth. Devices which access a server via a network normally transmit a user login name and password information at access time, and in addition, they transmit World Standard Time (=Greenwich Mean Time: GMT) information for the transmission time. Based on this information, the server executes access time management and authentication processing to determine whether or not access is permitted.

However, in the time setting function built into conventional video cameras, no function for obtaining or setting World Standard Time is provided. For this reason, when, for example, accessing the server via the network with the communication function included in the video camera, as described above, there are problems in that it is usually not possible to transmit World Standard Time information, which is required for access, the server therefore cannot be accessed, and thus it is not possible to perform, for example, video mail and so forth using the video camera unit.

Furthermore, if the time set by the time setting function of the video camera is used instead of World Standard Time, in the case where the time in the vicinity of London or the like, which is used a reference point for World Standard Time, is set, since the time is actually World Standard Time, no problems occur. However, if, for example, Japanese Standard Time is used instead of World Standard Time, since the nine-hour time difference (Japanese Standard Time has a nine-hour time difference with respect to World Standard Time) is not taken into account, when performing transmission and reception of mail and so forth; delivered by the server via the network, there will be a nine-hour time difference at that time, and it is therefore impossible to correctly ascertain the time at which the mail was transmitted and received, which is a problem.

DISCLOSURE OF THE INVENTION

The present invention has been developed in light of these circumstances, and in an information processing apparatus having an imaging function, such as a video camera, by using accurate World Standard Time information, which is calculated, the video camera itself, as a single unit, can access a server via a network.

The information processing apparatus of the present invention is characterized in that it is provided with an input unit formed of a rotary/pushbutton operating element, time setting means for setting the time using the input unit, area setting means for setting an area using the input unit, summertime information setting means for setting, using the input unit, information indicating whether or not summertime is in effect, and world standard time calculating means for calculating world standard time from the time set using the time setting means, the area set using the area setting means, and the information indicating whether or not summertime is in effect, which is set using the summertime information setting means.

It is possible to further provide area storage means for storing in advance a plurality of areas, and, in the area setting means, it is possible to set an area, input using the input unit, from among the areas stored in advance in the area storage means.

In the area storage means, it is possible to further store time-difference information, with respect to the world standard time, for each of the plurality of areas; and in the world standard time calculating means, the world standard time can be calculated from the time set using the time setting means, the time-difference information, with respect to world standard time, for the area input and set using the input means from among the areas stored in advance using the area storage means, and the information indicating whether or not summertime is in effect, which is set using the summertime information setting means.

It is possible to further provide an accessing means for accessing another information processing means via a network, and in the accessing means, when accessing the other information processing apparatus via the network, at that time, it is possible to send the world standard time information calculated using the world standard time calculating means to the other information processing apparatus.

An information processing method of the present invention is characterized in that it includes a time setting step of setting the time using an input unit; an area setting step of setting an area using the input unit; a summertime information setting step of setting, using the input unit, information indicating whether or not summertime is in effect; and a world standard time calculating step of calculating world standard time from the time set by the processing of the time setting step, the area set by the processing of the area setting step, and the information indicating whether or not summertime is in effect, which is set by the processing of the summertime information setting step.

A program, on a recording medium, of the present invention is characterized in that it includes a time setting control step of controlling the setting of the time using an input unit; an area setting control step of setting an area using the input unit; a summertime information setting control step of setting, using the control unit, information indicating whether or not summertime is in effect; and a world standard time calculating control step of controlling the calculation of world standard time from the time set by the processing of the time setting control step, the area set by the processing of the area setting control step, and the information indicating whether or not summertime is in effect, which is set by the processing of the summertime information setting control step.

A program of the present invention is characterized in that it causes a computer to execute a time setting control step of controlling the setting of the time using an input unit; an area setting control step of setting an area using the input unit; a summertime information setting control step of setting, using the input unit, information indicating whether or not summertime is in effect; and a world standard time calculating control step of controlling the calculation of world standard time from the time set by the processing of the time setting control step, the area set by the processing of the area setting control step, and the information indicating whether or not summertime is in effect, which is set by the processing of the summertime information setting control step.

In the information processing apparatus and method of the present invention, as well as in the program, by using an input unit formed of a rotary/pushbutton operating element, the time is set, an area is set, and information indicating whether or not summertime is in effect is set, and world standard time is calculated from the set time, the set area, and the set information indicating whether or not summertime is in effect.

BEST MODE FOR CARRYING OUT THE INVENTION

Figure 1:
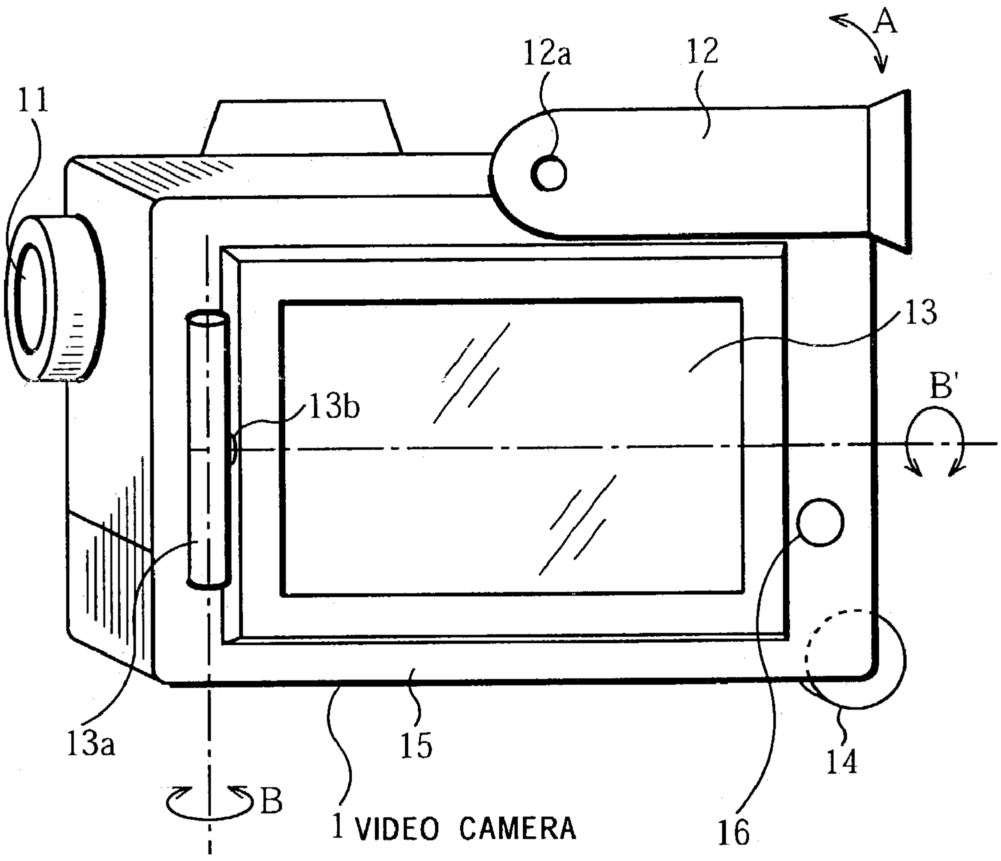
FIG. 1 is an outline view of a video camera showing the configuration of an embodiment employing the present invention.

FIG. 1 is an outline view showing the configuration of an embodiment of a video camera 1 according to the present invention. An imaging unit 11 is formed of an optical element such as a lens, etc. and an imaging element such as a CCD (Charge Coupled Device), etc., captures an image of a subject (not shown in the drawing), and outputs a video signal to a built-in circuit in a subsequent stage. An EVF (Electric View Finder) 12 is for checking the content of the image to be captured, and by looking at it, a user can check the image to be captured by the imaging unit 11, which is displayed on a small, built-in display (not shown in the drawing). The EVF 12 is arranged to be freely rotatable about an axis 12*a* and rotatable in the direction of arrow A with respect to a casing 15 from the state shown in FIG. 1, and can thus be used at any angle which the user desires.

An LCD (Liquid Crystal Display) 13 displays the images captured by the imaging unit 11 and can be rotated about an axis 13*a* in the direction of arrow B to an angle of approximately 90° with respect to the main unit. Furthermore, when it reaches the open state close to approximately 90° with respect to the casing 15, it is also arranged to be freely rotatable about an axis 13*b* in the direction of arrow B' to approximately 180°. Therefore, as shown in FIG. 1, the LCD 13 is able to display in the outward direction of the casing 15 of the video camera 1, and also, when the LCD 13 is not being used, it can be folded away against the side of the casing 15.

Figure 2:
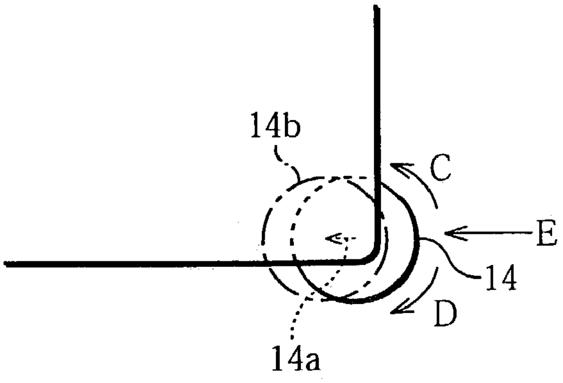
FIG. 2 is a drawing for explaining a jog-dial in FIG. 1.

A jog-dial (rotary/pushbutton operating element) 14 is provided at the bottom end of the casing 15 and, as shown in FIG. 2, can rotate about an axis 14*a* in the direction of arrows C and D. Furthermore, it can be pressed in the direction of arrow E shown in FIG. 2, and functions as a set (selection) button when put into the state of a jog dial 14*b* in FIG. 2. Accordingly, by rotating the jog-dial 14 in the direction of arrows C and D, the user can select various settings which are displayed on the setting screen displayed on the LCD 13 described above, and also, by pressing it in the direction of arrow E, the selected processing can be set, thus causing it to be executed. Moreover, a menu button 16 is provided on the side surface of the casing 15, which is pressed by the user to call-up or exit the settings screen.

Next, the electrical configuration of the video camera in FIG. 1 is described with reference to FIG. 3.

A combining circuit 21 outputs the video signal input by the imaging unit 11 to the EVF 12, the LCD 13, and a VTR (Video Tape Recorder) unit 30, and in addition, when a switch 21*a* which is controlled by the setting screen display control unit 22, is switched on, it combines video signals for various setting screens input by the setting screen display control unit 22 with the video signal input by the imaging unit 11 and outputs them to the EVF 12, the LCD 13, and the VTR unit 30.

The setting screen display control unit 22 is controlled by a microcomputer 24 to read video signals for predetermined setting screens from a ROM 23 and output them to the combining circuit 21. The microcomputer 24 is formed of a CPU (Central Processing Unit) 24*a*, a ROM (Read Only Memory) 24*b*, and a RAM (Random Access Memory) 24*c* and controls the overall operation of the video camera 1, and the CPU 24*a* loads a program stored in the ROM 24*b* into the RAM 24*c* as appropriate and executes it. Moreover, the microcomputer 24 reads a program recorded in a magneto-optical disk 311, an optical disk 312, a magneto-optical disk 313, and a semiconductor memory 314, mounted in a drive 301, loads it into the RAM 24*c*, and executes it, and also records various programs and data. Furthermore, the microcomputer 24 stores various settings information, to be described later, in the internal RAM 24*c*, reads it as appropriate, and executes it. A real-time clock 25 is controlled by the microcomputer 24 and serves to count the time set inside the video camera 1. It is set by date and time setting processing, to be described later.

The storage unit 26 is formed of a so-called hard disk or the like and stores area information 26*a*, a GMT program 26*b*, a network access program 26*c*, and so on. Regarding the area information 26*a*, regions are stored therein, which are referred to when performing the date and time setting processing described below, and inside, an region name for each individual region and a time difference with respect to World Standard Time are stored. The GMT program b is a program which calculates World Standard Time, that is to say, Greenwich Mean Time, based on the current time given by the real-time clock 25 for each area, which is set by the date and time setting processing, and the time difference stored in the area information 26*a*. The network access program 26*c* is a program that is executed when accessing the server 32 via the Internet 21 by controlling the communication unit 29.

A battery 27 is formed of, for example, a lithium ion battery, etc. and supplies electrical power to the entire video camera 1. An input unit 28 outputs to the microcomputer 24 signals which are input from the jog-dial 14, the menu button 16, other operation buttons that are not shown (buttons for switching the power supply of the video camera 1 on and off and for specifying processes such as play, stop, record, pause and eject), and so on. The communication unit 29 is formed of a modem or the like and is controlled by the microcomputer 24 to access the server 32 via the Internet 31 for sending and receiving various kinds of data. The VTR unit 30 is controlled by the microcomputer 24 and records the video signal input by the combining circuit 21 onto a video cassette tape (not shown), which is the recording medium. In addition, it reads the video signal recorded on the video cassette tape and outputs it to the EVF 12 or the LCD 13 for display thereon.

Next, setting processing is described with reference to the flowcharts in FIGS. 4 and 5.

In step S1, the microcomputer 24 determines whether or not the menu button 16 is pushed through the input unit 28, and repeats this processing until it is pushed. When it is determined that it is pushed, the processing proceeds to step S2.

Figure 6:
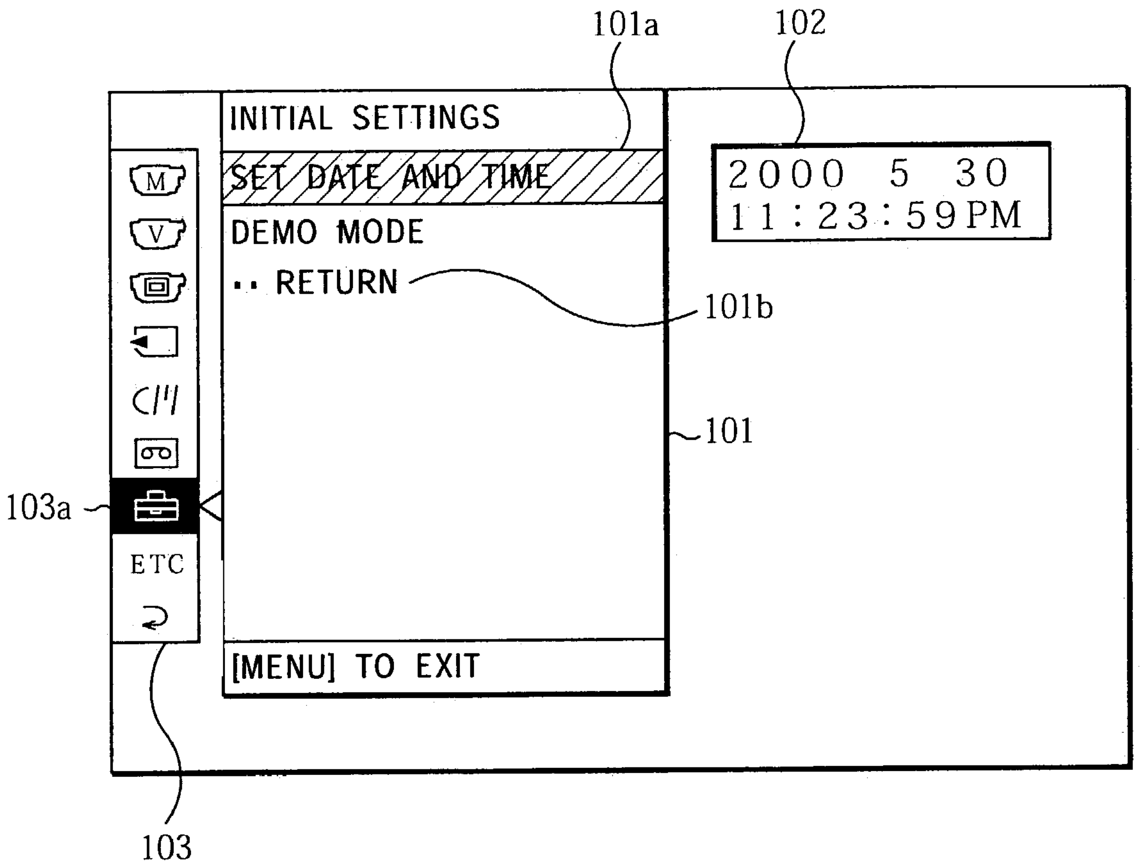
FIG. 6 is a drawing showing an example of a setting screen display which is displayed on an LCD in FIG. 1.

In step S2, the microcomputer 24 controls the setting screen display control unit 22 and sends an instruction for displaying a menu screen which is stored in the ROM 23. At this time, the setting screen display control unit 22 reads out a video signal for the menu screen from the ROM 23, then, by controlling the switch 21 of the combining circuit 21 to switch on, outputs it to the EVF 12 and the LCD 13, and displays a menu display field 103, which is shown in FIG. 6. Icons by which various operations can be selected are displayed in the menu display field 103 in FIG. 6, and it is possible to select the processing with a cursor 103*a* which can move up and down using the jog-dial 14.

In step S3, the microcomputer 24 determines whether or not an icon representing initial settings in the menu display field 103 is selected. For example, as shown in FIG. 6, if the jog-dial 14 is operated in the direction of arrows C and D so that the cursor 103*a* provided on the menu display field 103 moves, and is pushed in the direction of arrow E at the position of the icon indicating initial settings (in the present case, the seventh icon from the top of the menu display field 103 in FIG. 6 is the icon indicating initial settings) to select it, the microcomputer 24 controls the setting screen display control unit 22 to read out from the ROM 23 a video signal corresponding to an initial settings list 101 shown in FIG. 6, and then switches on the switch 21*a* of the combining circuit 21 to display the signal on the LCD 13. In the present case, a "set date and time" display field 101*a*, a "demo mode" display field, and a "return" display field 101*b* are displayed on the initial settings list 101 shown in FIG. 6. Also, a time display field 102 is displayed at the right-hand side of the initial settings list 101, where the current time is displayed. In the present case, "2000 5 30 11:23:59 PM" is displayed in the time display field 102, which indicates that the present time is "30 May, 2000, 11:23:59 PM". The cursor, which is inverted to indicate which of the various display fields is displayed, is shown on the initial settings list 101. This cursor can be made to move up and down with the rotation of the jog-dial 14 in the direction of arrow C or in the direction of arrow D in FIG. 2, and the various processes can be selected, and therefore it is possible to set a process by pushing the jog-dial in the direction of arrow E in FIG. 2, thus causing it to be executed. In the present case, the cursor is located at the set date and time display field 101*a*. Herein, the method of operating the cursor is the same for the other setting screens, too.

In step S5, the microcomputer 24 determines whether or not "set date and time" is selected. For example, as shown in FIG. 6, in the case where the cursor is moved using the jog-dial 14 to select (set) the "set date and time" display field 101*a*, date and time setting processing is executed in step S6.

Here, the date and time setting processing will be described with reference to the flowchart in FIG. 7.

In step S31, the microcomputer 24 controls the real-time clock 25 to stop the time counter. In step S32, the microcomputer 24 controls the setting screen display control unit 22 to display the area setting screen shown in FIG. 8 on the LCD 13 (the same video signal is also displayed on the EVF 12).

Figure 8:
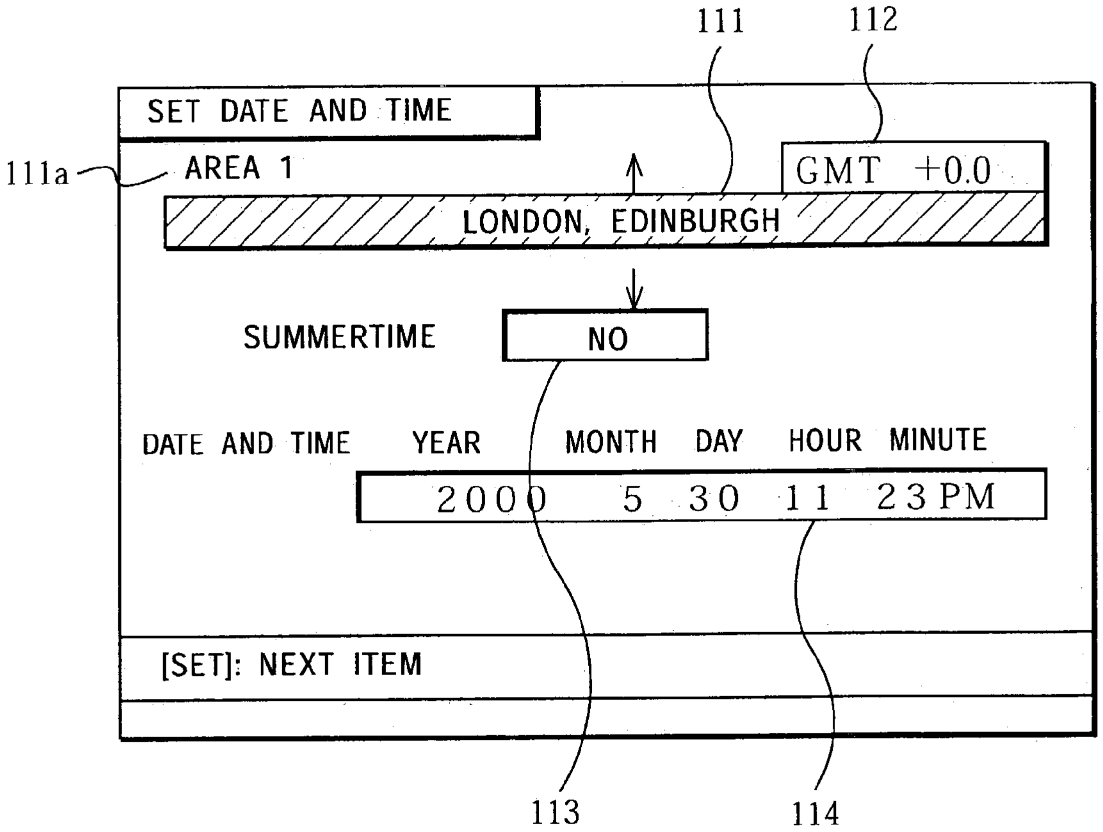
FIG. 8 is a drawing showing an example of a setting screen display which is displayed on the LCD in FIG. 1.

An area selection field 111 is displayed on the area setting screen shown in FIG. 8, and it is possible to select the desired area from a plurality of areas registered in advance in the area information 26*a* in the storage unit 26 by using the jog-dial 14. In the present case, "London, Edinburgh" is shown as being selected on the area setting screen. To the upper left of the area selection field 111, an area-number display field 111*a* is provided, in which a number corresponding to the area displayed in the area selection field 111 is displayed. In the present case, "Area 1" is displayed in the area-number display field 111*a*, which indicates that the area number corresponding to "London, Edinburgh", which is selected by the area selection field 111, is "Area 1". In this example, the number of areas registered in the area information 26*a* is 29; however, it is also possible to register a number other than 29, thus allowing other ones to be registered and unnecessary areas to be removed.

To the upper right of the area selection field 111, a GMT time-difference display field 112 is displayed, in which the time difference with respect to World Standard Time is displayed. The time difference displayed in the GMT time-difference display field 112 is registered in advance in the area information 26*a* and is displayed according to the area displayed in the area selection field 111. In the present case, "GMT +0.0" is displayed in the GMT time-difference display field 112, which indicates that the time for the area "London, Edinburgh" displayed in the area selection field 111 has no time difference, that is, it is the same as World Standard Time.

A summertime selection field 113, which indicates whether or not summertime is in effect, is provided below the area selection field 111, and it is thus possible to select whether or not summertime is in effect. In the present case, "No" is displayed in the summertime selection field 113, which indicates that summertime mode is not set. A date and time selection field 114 is provided below the summertime selection field 113, and it is thus possible to set the date and time which are set. In the present case, in the date and time selection field 114, "2000" is displayed in the year field, "5" is displayed in the month field, "30" is displayed in the day field, "11" is displayed in the hour field, which is indicated by "hour", "23" is displayed in the minute field, and "PM" is displayed in the field indicated AM/PM, which indicates that the current time is 30 May, 2000, 11:23 PM. If the area selection field 111, the summertime selection field 113, and the date and time selection field 114 are in a state in which they can be selected using the jog-dial 14, that is to say, in an active state, they are displayed as highlighted. In the present case, the area selection field 111 is active, which is indicated by the fact that it is displayed as highlighted (the background in the field is displayed in a different color from the other fields).

In step S33, the microcomputer 24 executes area setting processing.

Figure 9:
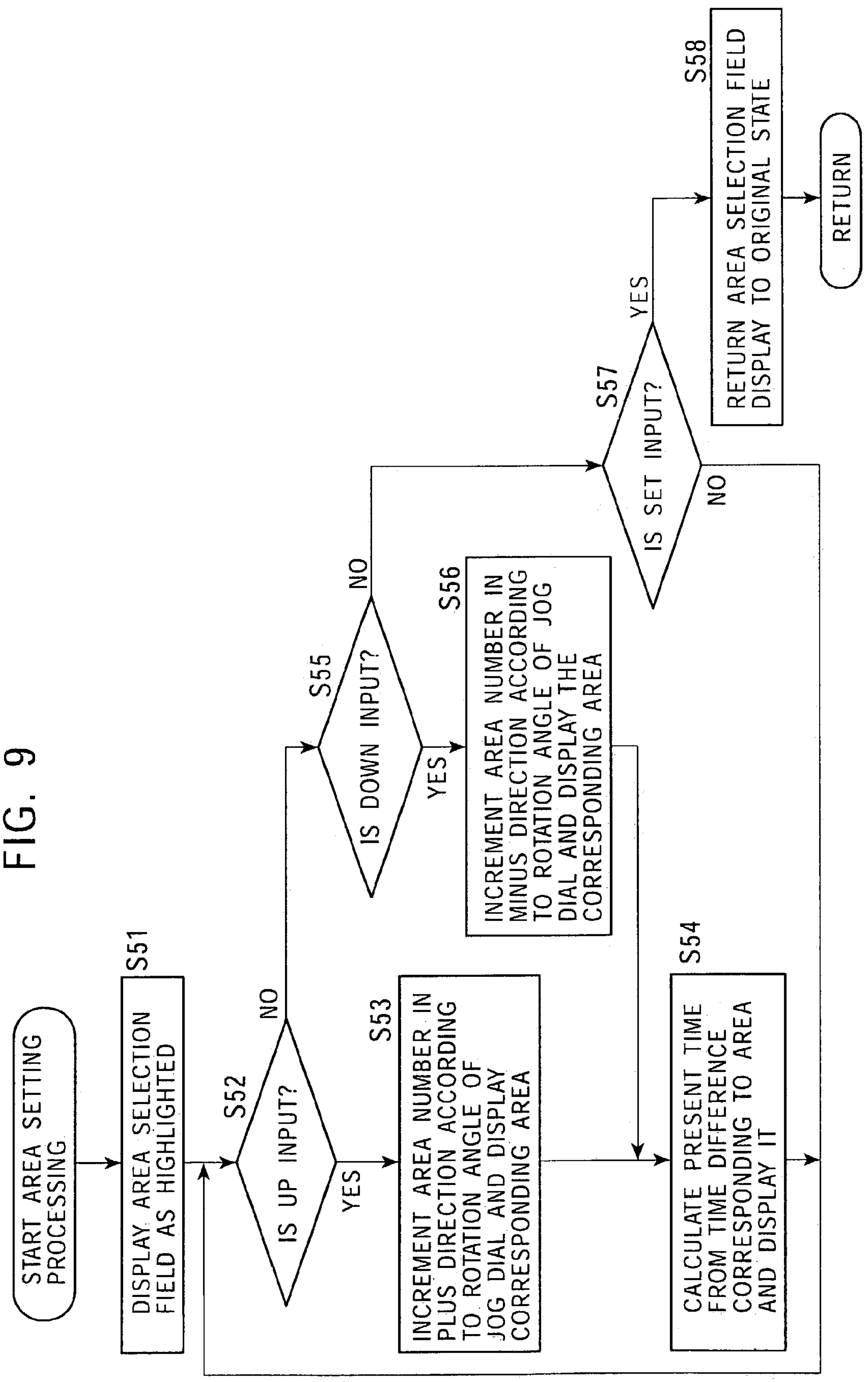
FIG. 9 is a flowchart for explaining area setting processing.

Here, the-area setting processing will be described with reference to the flowchart in FIG. 9.

In step S51, the microcomputer 24 controls the setting screen display control unit 22 to highlight the area selection field 111, as shown in FIG. 8.

In step S52, the microcomputer 24 determines whether or not UP is input using the jog-dial 14. For example, if it is detected that the jog-dial 14 has rotated by a predetermined rotation angle in the direction of arrow C shown in FIG. 2, it is determined that UP has been input and the processing then proceeds to step S53.

Figure 10:
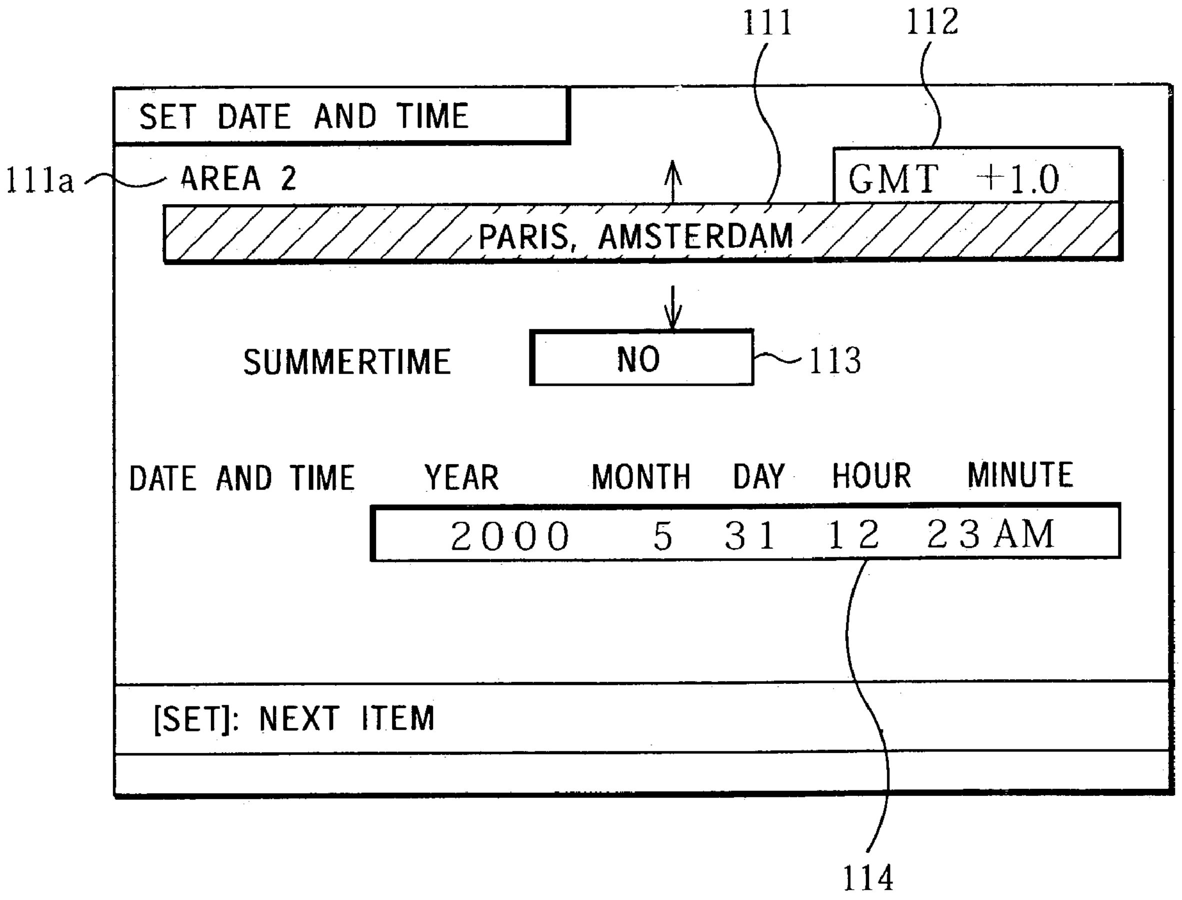
FIG. 10 is a drawing showing an example of a setting screen display which is displayed on the LCD in FIG. 1.

In step S53, the microcomputer 24 increments the area number in the plus direction according to the rotation angle of the jog-dial 14, displays the corresponding area number in the area-number display field 111*a*, and then displays the area corresponding to that area number in the area selection field 111. In the present case, for example, when the jog dial is rotated by an amount which increments the area number by 1, as shown in FIG. 10, "Paris, Amsterdam" is displayed in the area display field 111, "Area 2" is displayed in the area-number display field 111*a*, and "GMT +1.0" is displayed in the GMT time-difference display field 112, which indicates that the area corresponding to Area 2, the area number having been incremented by 1, is "Paris, Amsterdam", and that there is a time difference of +1 hour with respect to World Standard Time.

In step S54, the microcomputer 24 calculates the current time according to the time difference displayed in the GMT time-difference display field 112, displays it in the date and time selection field 114, and the processing then returns to step S52. In other words, in the present case, since the time difference is +1.0 hour, then 31 May, 2000, 12:23 AM, which is 30 May, 2000, 11:23 PM plus one hour, which is the date and time shown in the date and time selection field 114 in FIG. 8, is displayed in the date and time display field 114 in FIG. 10.

If UP is input in step S52, in step 855, the microcomputer 24 determines whether or not DOWN is input using the jog-dial 14. For example, if it is detected that the jog-dial 14 has rotated in the direction of arrow D shown in FIG. 2 by a predetermined rotation angle, the processing proceeds to step S56.

Figure 11:
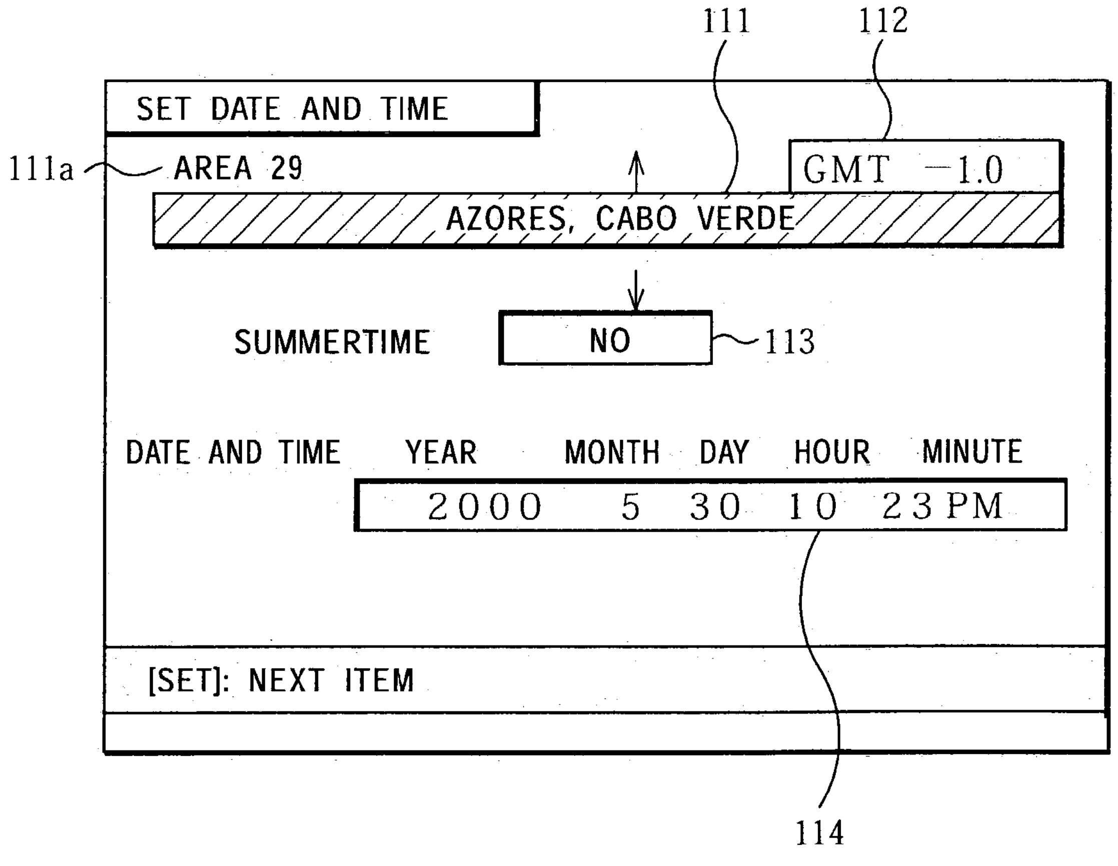
FIG. 11 is a drawing showing an example of a setting screen display which is displayed on the LCD in FIG. 1.

In step S56, the microcomputer 24 increments the area number in the minus direction according to the rotation angle of the jog-dial 14, displays the corresponding area number in the area-number display field 111*a*, and then, after displaying the area corresponding to that area number in the area selection field 111, the processing proceeds to step S54. For example, when the jog-dial 14 is made to rotate by an amount for incrementing the area number by −1, as shown in FIG. 11, "Azores, Cabo Verde" is displayed in the area display field 111, "Area 29" is displayed in the area-number display field 111*a*, and "GMT −1.0" is displayed in the GMT time-difference display field 112, which indicates that the area corresponding to Area 29, which was obtained by incrementing the area number by −1, is "Azores, Cabo Verde", and that there is a time difference of −1 hour with respect to World Standard. Time.

In step S55, when it is determined that DOWN is not input, in step S57, the microcomputer 24 determines whether or not SET is input using the jog-dial 14. For example, if SET is not input, in other words, if it is determined that the jog-dial 14 is not pressed in the direction of arrow E shown in FIG. 2, the processing returns to step S52 and the processing thereafter is repeated. If it is determined that SET is input in step S57, in step S58, the microcomputer 24 returns the highlighted display of the area selection field 111 to its original state and, after completing that processing, proceeds to step S34 in FIG. 7.

Figure 7:
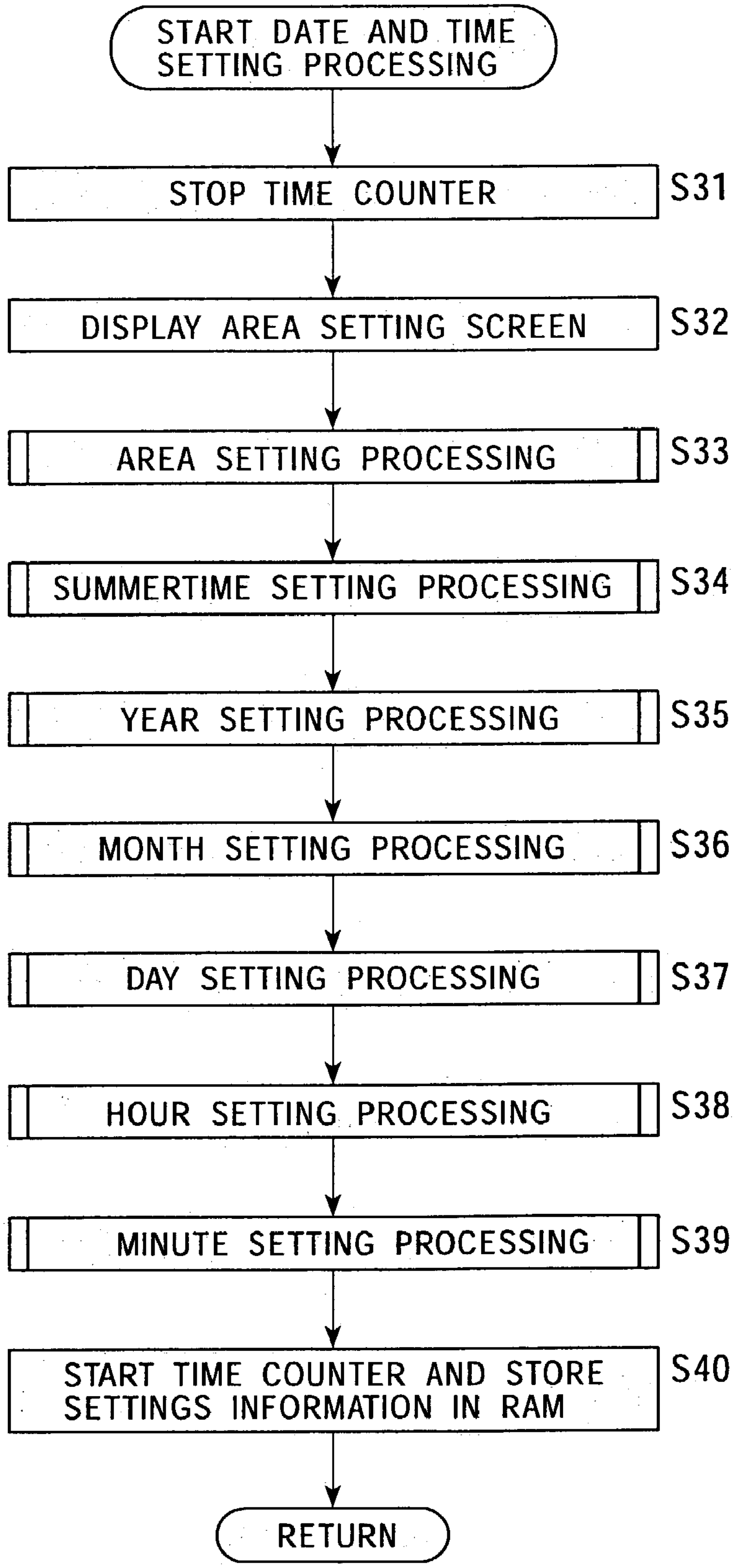
FIG. 7 is a flowchart for explaining date and time setting processing.

Here, we return to the description of the flowchart in FIG. 7.

In step S34, the microcomputer 24 executes summertime setting processing.

Figure 12:
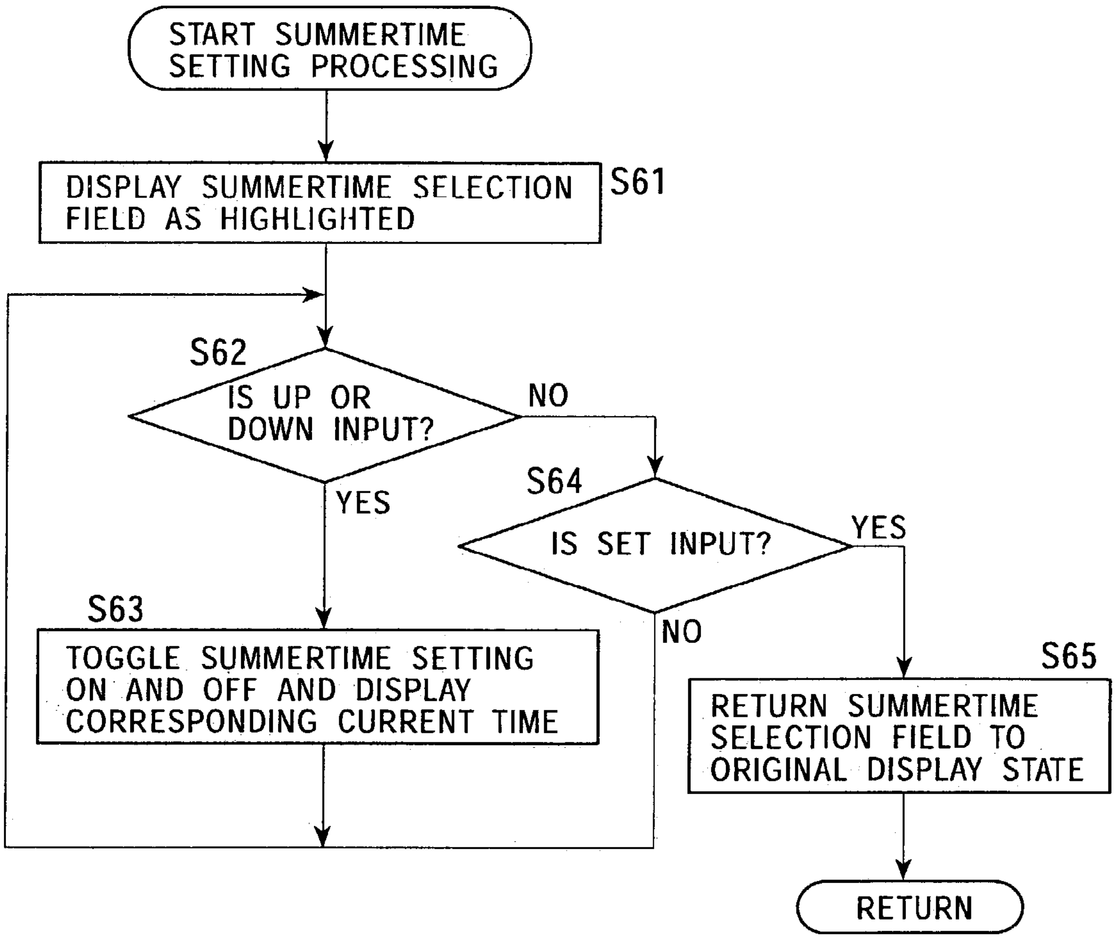
FIG. 12 is a flowchart for explaining summertime setting processing.
Figure 13:
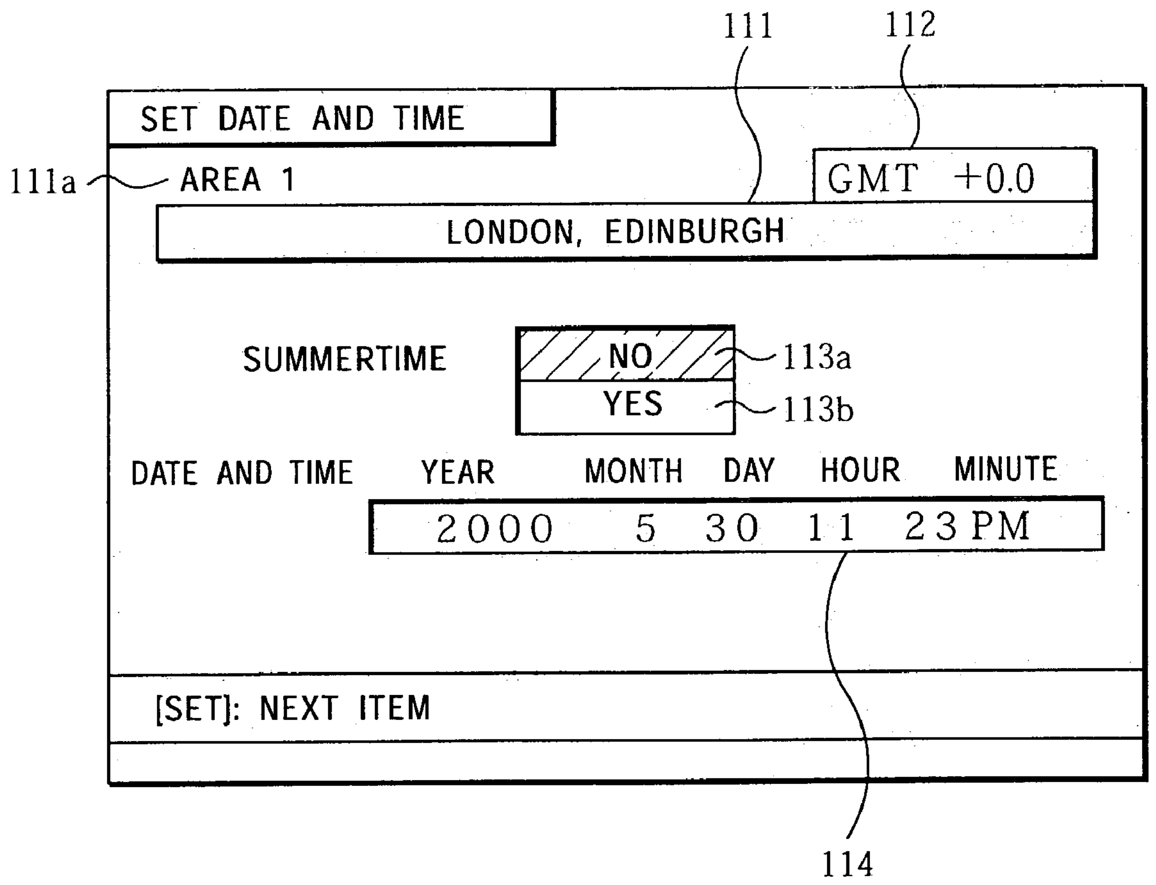
FIG. 13 is a drawing showing an example of a setting screen display which is displayed on the LCD in FIG. 1.

Here, the summertime setting processing will be described with reference to the flowchart in FIG. 12. In step S61, the microcomputer 24 controls the setting screen display control unit 22 to display the summertime selection field 113 in a format wherein, as shown in FIG. 13, "No" is displayed in a summertime selection field 113*a* and "Yes" is displayed in a summertime selection field 113*b*, and the selected state is displayed as highlighted. In the present case, for example, as shown in FIG. 13, since the summertime selection field 113*a*, in which "No" is displayed, is highlighted, the not-summertime mode is selected.

Figure 14:
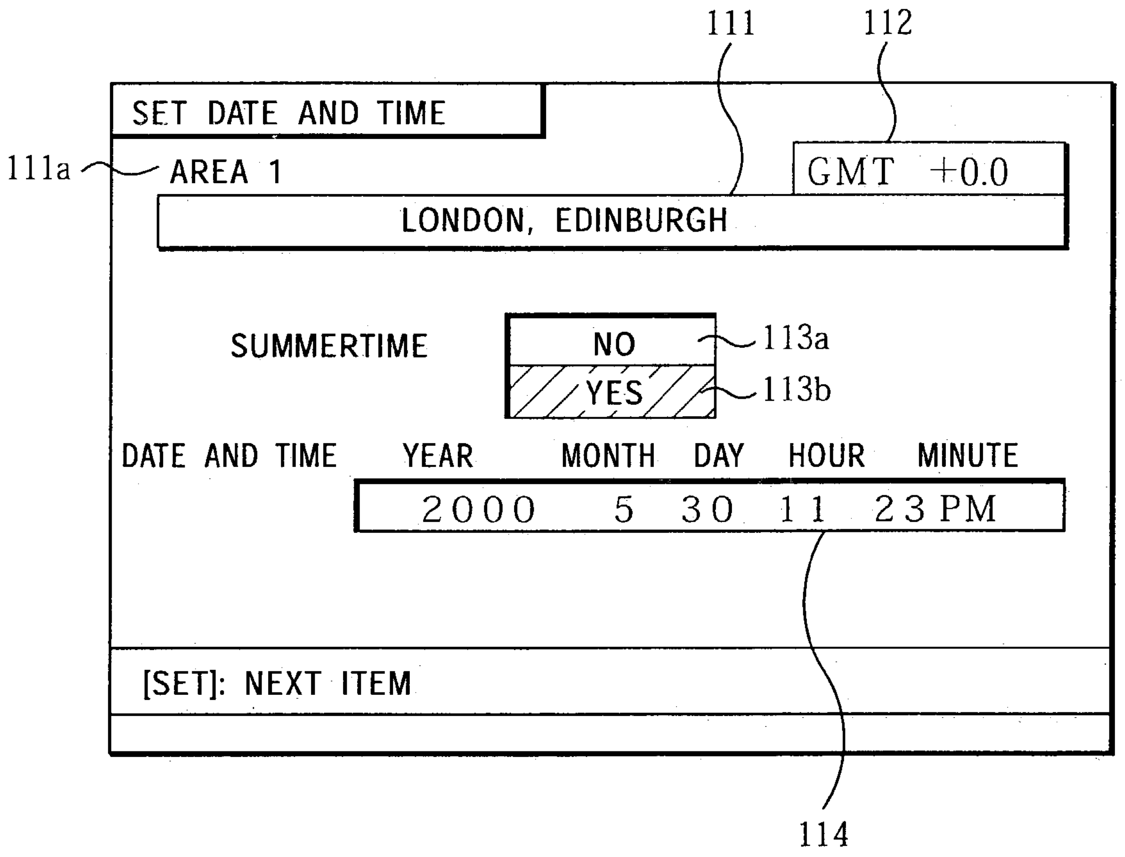
FIG. 14 is a drawing showing an example of a setting screen display which is displayed on the LCD in FIG. 1.
Figure 31:
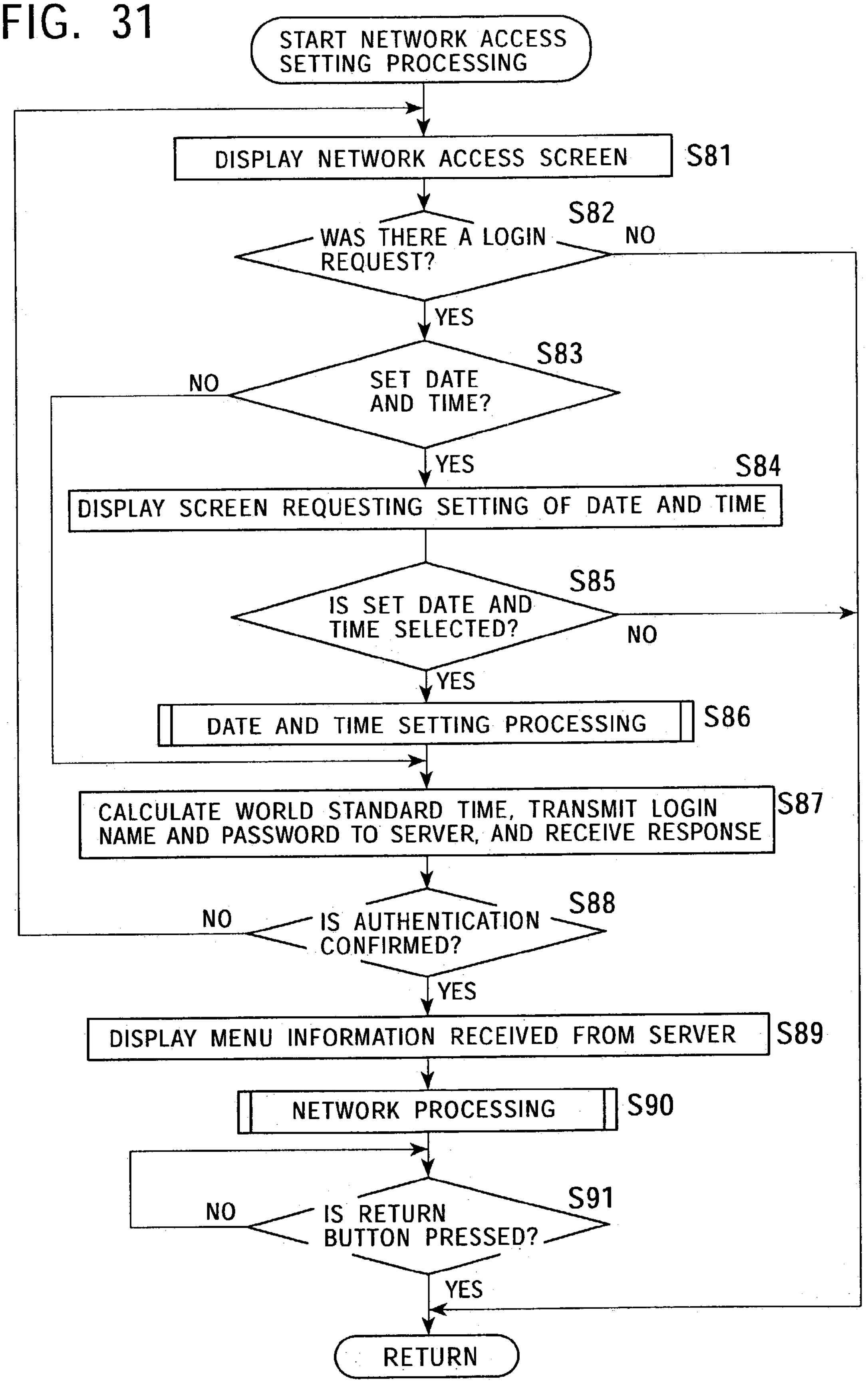
FIG. 31 is a flowchart for explaining network access processing.

In step S62, the microcomputer 24 determines whether or not UP or DOWN is input using the jog-dial 14. For example, if it is determined that the jog-dial 14 is rotated by a predetermined rotation angle either in the direction of arrow C or in the direction of arrow D in FIG. 2, in step S63, the microcomputer 24 controls the setting screen display control unit 22 to change the highlighting of the summertime selection field 113 and then displays the current time shown in the current date and time selection field 114 by changing it depending on whether or not summertime is in effect. In other words, in the present case, as shown in FIG. 14, it changes the highlighting of the summertime selection field 113*a*, in which "No" is displayed, to the summertime selection field 113*b*, in which "Yes" is displayed, and also, it changes the time displayed in the date and time selection field 114 to the summertime time, that is to say, it changes the display from 30 May, 2000, 11:23 PM, when summertime is not in effect, as shown in FIG. 13, to 31 May, 2000, 12:23 AM, when summertime is in effect, as shown in FIG.

14. If the jog-dial 14 is operated in the same way as described above in the state shown in FIG. 14, the opposite processing is executed, and the display is changed from the summertime time to the not-summertime time.

Figure 15:
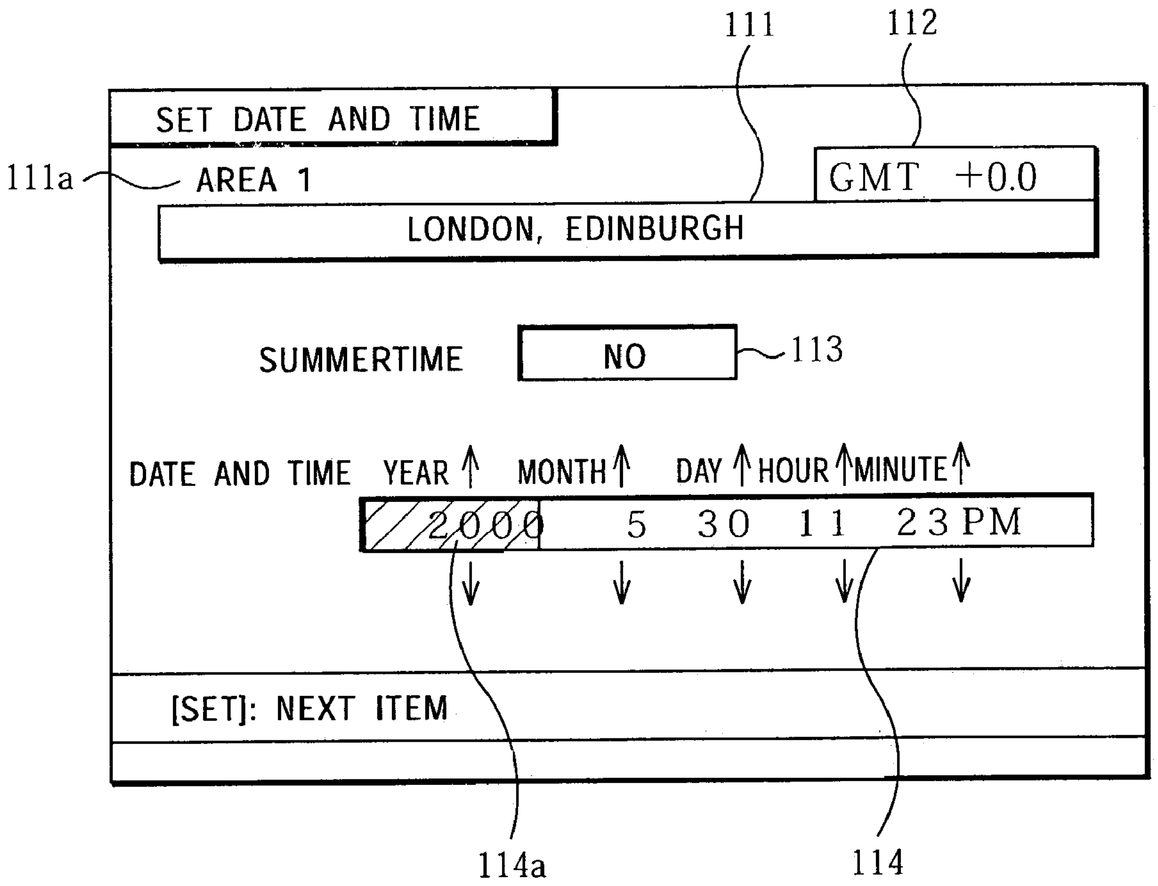
FIG. 15 is a drawing showing an example of a setting screen display which is displayed on the LCD in FIG. 1.
Figure 16:
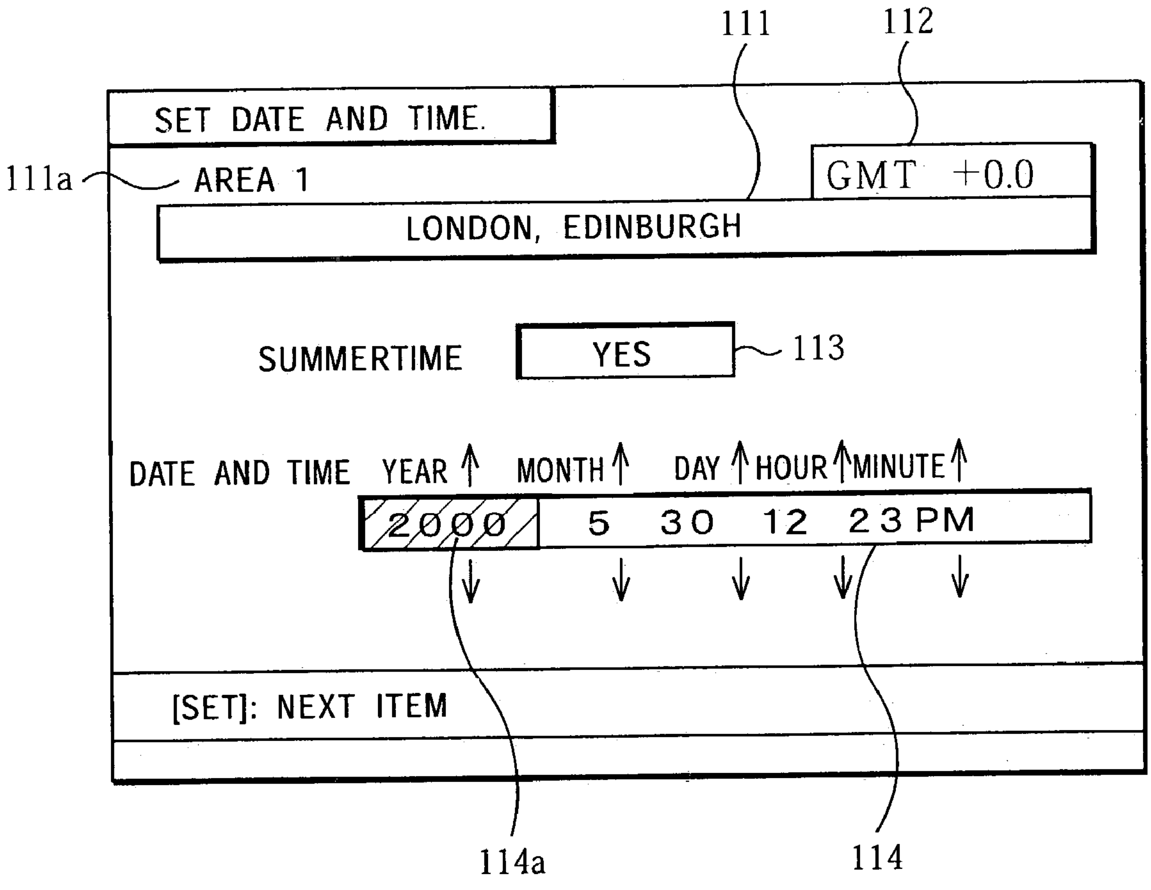
FIG. 16 is a drawing showing an example of a setting screen display which is displayed on the LCD in FIG. 1.

If UP or DOWN is not input in step S62, in step S64, it is determined whether or not SET is input, and when it is determined that SET is not input, the processing returns to step S62. If it is determined in step S64 that SET is input, in step S65, the microcomputer 24 returns the summertime selection field 113 to its original display state and, after completing that processing, proceeds to step S35 in FIG. 7. That is to say, if SET is input in the state shown in FIG. 13, as shown in FIG. 15, the not-summertime mode, in which "No" is displayed in the summertime selection field 113, is set and the display is returned to its original state. Also, in the same way, if SET is input in the state shown in FIG. 14, the summertime mode, in which "Yes" is displayed in the summertime selection field 113, is set and the display is returned to its original state.

Here, we return to the description of the flowchart in FIG. 7.

In step S35, the microcomputer executes year setting processing.

Figure 17:
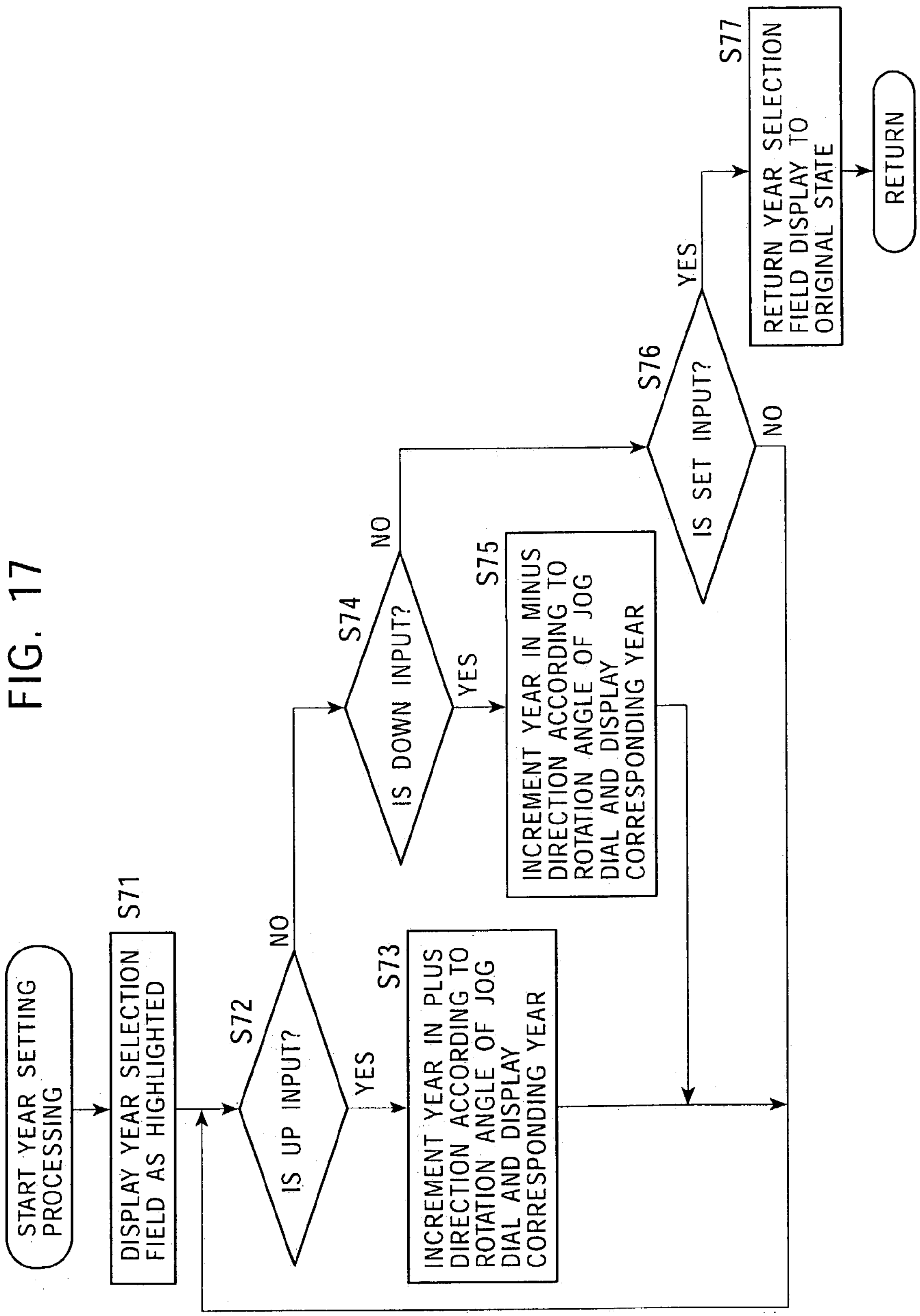
FIG. 17 is a flowchart for explaining year setting processing.

Here, the year setting processing is described with reference to the flowchart in FIG. 17. In step S71, the microcomputer 24 controls the setting screen display control unit 22 to display a year selection field 114*a* in the date and time selection field 114 as active, in other words, it displays it as highlighted. For example, as shown in FIG. 13, if the year setting processing is executed when the summertime selection field 113 is "No", in other words, in the not-summertime mode, the year number set until that point, in other words, "2000", is displayed as highlighted, as shown in FIG. 15.

In step S72, the microcomputer 24 determines whether or not UP is input using the jog-dial 14. For example, if it is detected that the jog-dial 14 rotates by a predetermined rotation angle in the direction of arrow C shown in FIG. 2, then it determines that UP is input, and the processing proceeds to step S73.

In step S73, the microcomputer 24 increments the year number in the + direction according to the rotation angle of the jog-dial 14, and then displays the corresponding year number in the year selection field 114*a* and the processing returns to step S71. In other words, in the present case, since "2000" is displayed in the year selection field 114*a* the display changes to 2001, 2002, 2003, . . . according to the rotation angle of the jog-dial 14.

When it is determined in step S72 that UP is not input, in step S74, the microcomputer 24 determines whether or not DOWN is input using the jog-dial 14. For example, if it is detected that the jog-dial 14 rotates by a predetermined rotation angle in the direction of arrow D shown in FIG. 2, it determines that DOWN is input, and the processing proceeds to step S75.

In step S75, the microcomputer 24 increments the area number in the—direction according to the rotation angle of the jog-dial 14, displays the corresponding year number in the year selection field 114*a*, and then the processing returns to step S71. In other words, in the present case, since "2000" is displayed in the year selection field 114*a*, the display is changed to 1999, 1998, 1997, . . . according to the rotation angle of the jog-dial 14.

If it is determined in step S74 that DOWN is not input, in step S76, the microcomputer 24 determines whether or not SET is input using the jog-dial 14. For example, if it is determined that the jog-dial 14 is not pressed in the direction of arrow E in FIG. 2 (SET is not input), then the processing returns to step S72 and the processing thereafter is repeated. If it is determined in step S76 that SET is input, in step S77, the microcomputer 24 returns the year selection field 114*a* to its original display state and sets the year number displayed at that time in the year selection field 114*a*. In addition, when that processing is completed, the processing proceeds to step S36 in FIG. 7.

Here we return to the description of the flowchart in FIG. 7.

Figure 18:
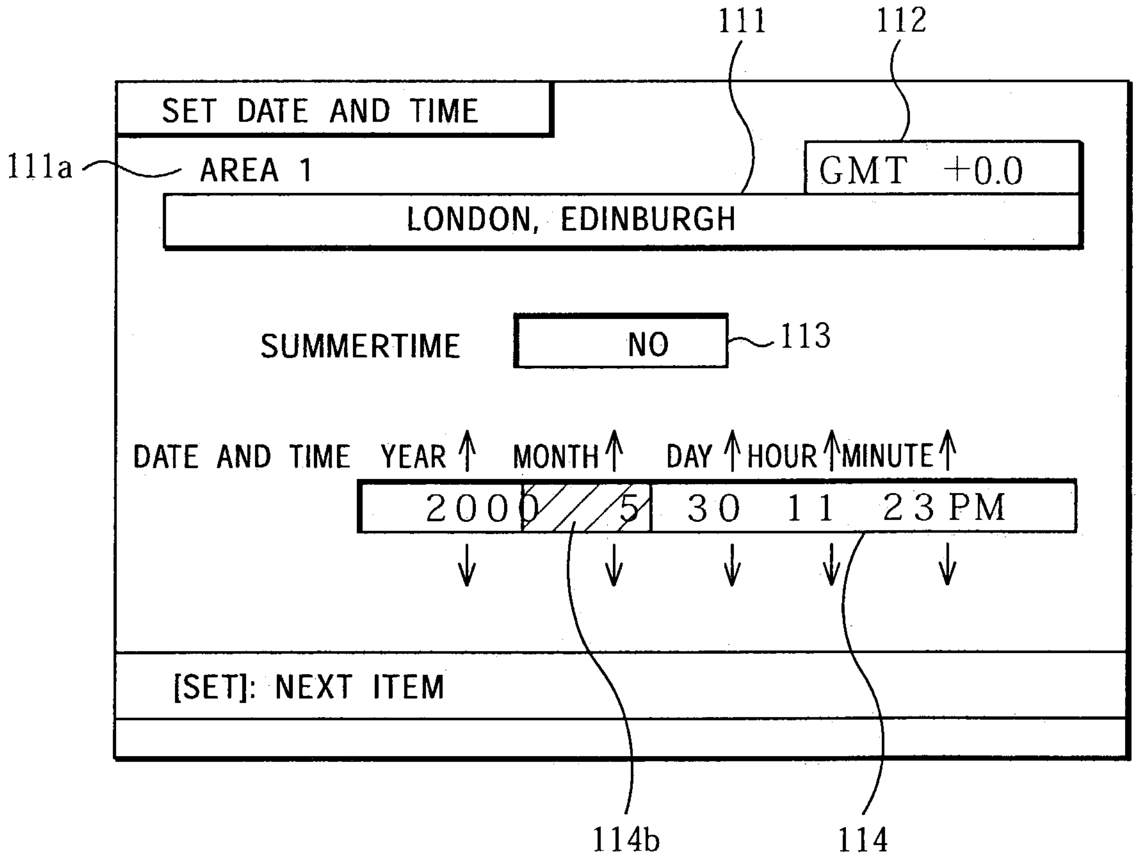
FIG. 18 is a drawing showing an example of a setting screen display which is displayed on the LCD in FIG. 1.

In step S36, month setting processing is executed. In other words, as shown in FIG. 18, a month selection field 114*b* in the date and time selection field 114 is displayed as highlighted, and the month is set using the jog-dial 14. In the present case, "5" is displayed in the month selection field 114*b*, which indicates that the month is set to May. Since the setting in the month setting processing is the same as the processing in the year setting processing described with reference to the flowchart in FIG. 17, a description thereof is omitted.

Figure 19:
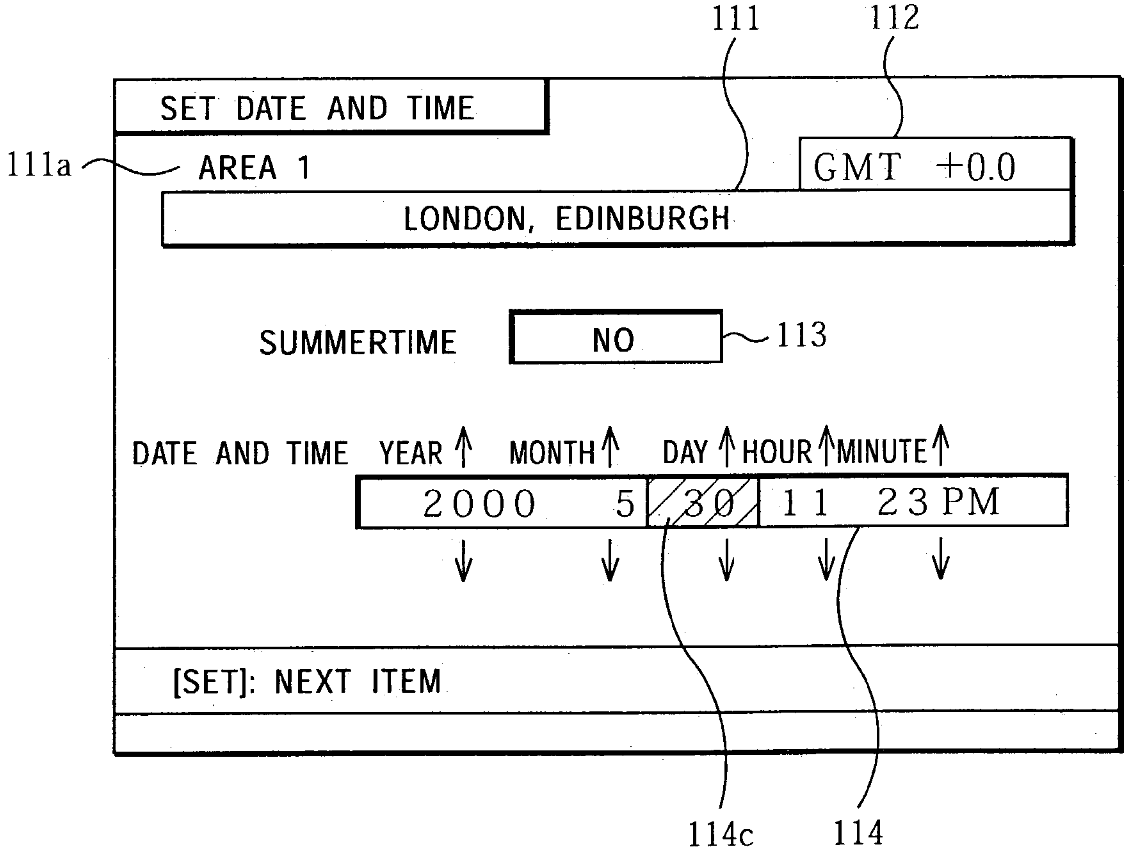
FIG. 19 is a drawing showing an example of a setting screen display which is displayed on the LCD in FIG. 1.

Day setting processing is executed in step S37. That is to say, as shown in FIG. 19, a day selection field 114*c* in the date and time selection field 114 is displayed as highlighted and the day is set using the jog-dial 14. In the present case, "30" is displayed in the day selection field 114*c*, which indicates that the 30th is set. Since the setting in the day setting processing is the same as the processing in the year setting processing described with reference to the flowchart in FIG. 17, a description thereof is omitted.

Figure 20:
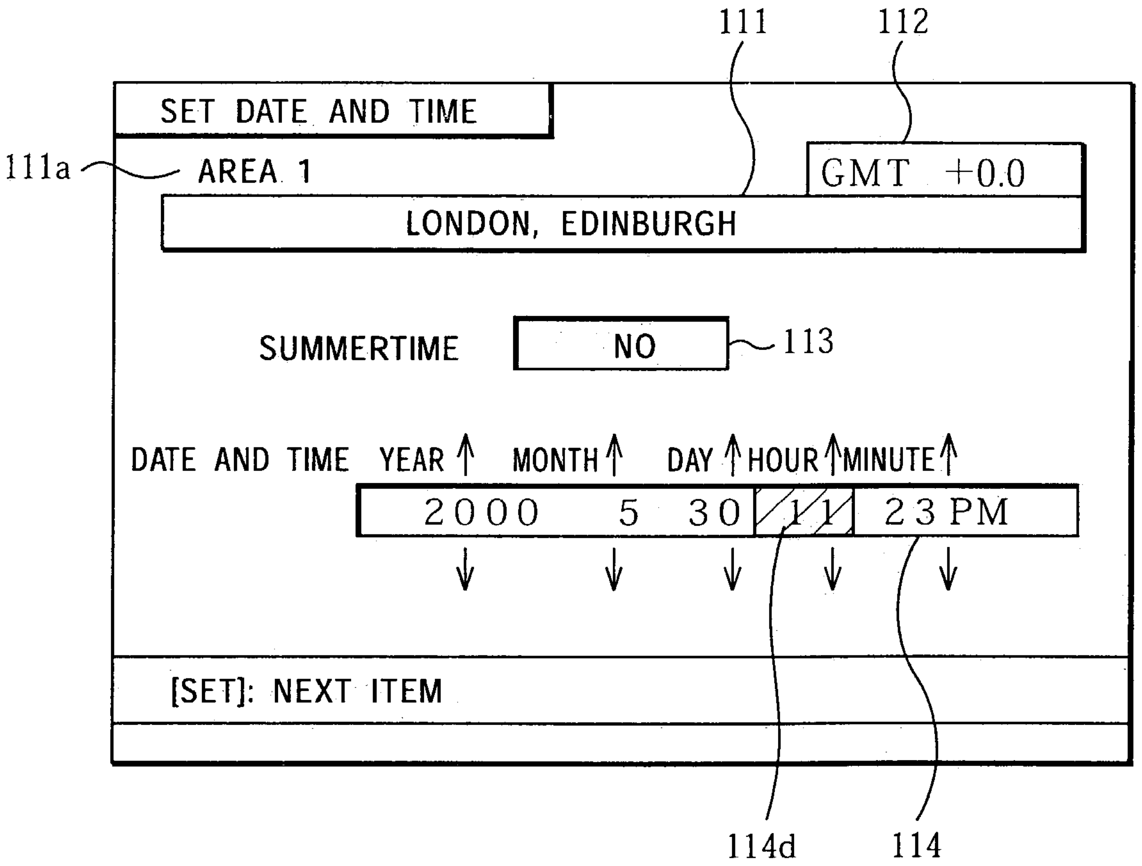
FIG. 20 is a drawing showing an example of a setting screen display which is displayed on the LCD in FIG. 1.

Hour setting processing is executed in step S38. That is to say, as shown in FIG. 20, an hour selection field 114*d* in the date and time selection field 114 is displayed as highlighted and the hour is set using the jog-dial 14. In the present case, "11" is displayed in the hour selection field 114*d*, which indicates that 11 o'clock is set. "AM", if it's before noon, or "PM", if it's after noon, is displayed at the right end of the date and time selection field 114 according to the hour set in the hour selection field 114*d*. In the present case, "PM" is displayed, which indicates that it is afternoon. Since the setting in the hour setting processing is the same as the processing in the year setting processing described with reference to the flowchart in FIG. 17, a description thereof is omitted.

Figure 21:
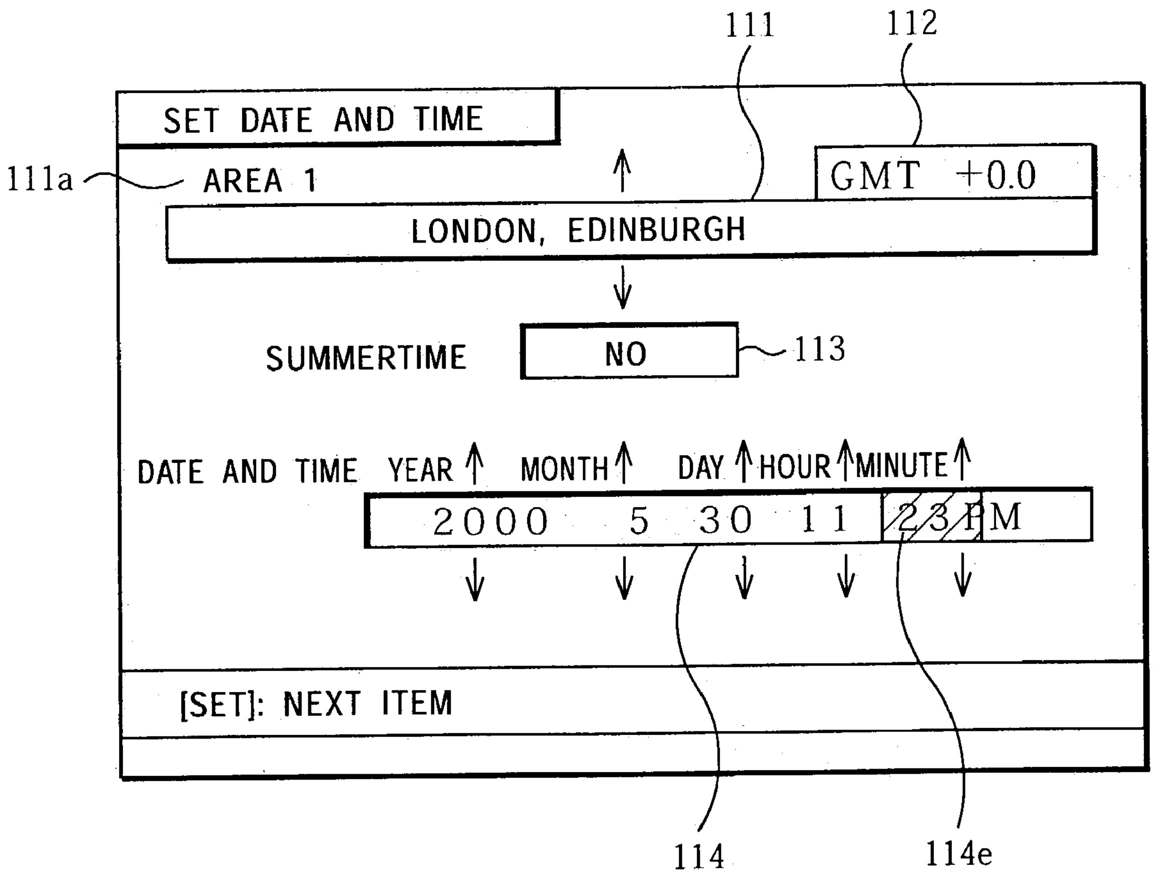
FIG. 21 is a drawing showing an example of a setting screen display which is displayed on the LCD in FIG. 1.

Minute setting processing is executed in step S39. That is to say, as shown in FIG. 21, a minute selection field 114*e* in the date and time selection field 114 is displayed as highlighted and the minutes are set using the jog-dial 14. In the present case, "23": is displayed in the minute selection field 114*e*, which indicates that 23 minutes is set. Since the setting in the minute setting processing is the same as the processing in the year setting processing described with reference to the flowchart in FIG. 17, a description thereof is omitted.

In step S40, the microcomputer 24 controls the real-time clock 25 to start counting time from the time that was set and displays the initial settings screen on the LCD 13, in which the initial settings list 101 shown in FIG. 6 is displayed. In addition, it stores in the built-in RAM 24*c* the selected area (including corresponding time-difference information stored in the area information 26*a*) and settings information indicating whether or not summertime is in effect. The processing then proceeds to step S7 in FIG. 4. When the counter of the real-time clock 25 starts, the seconds of the current time are set to zero at the point in time when the counter starts.

Figure 4:
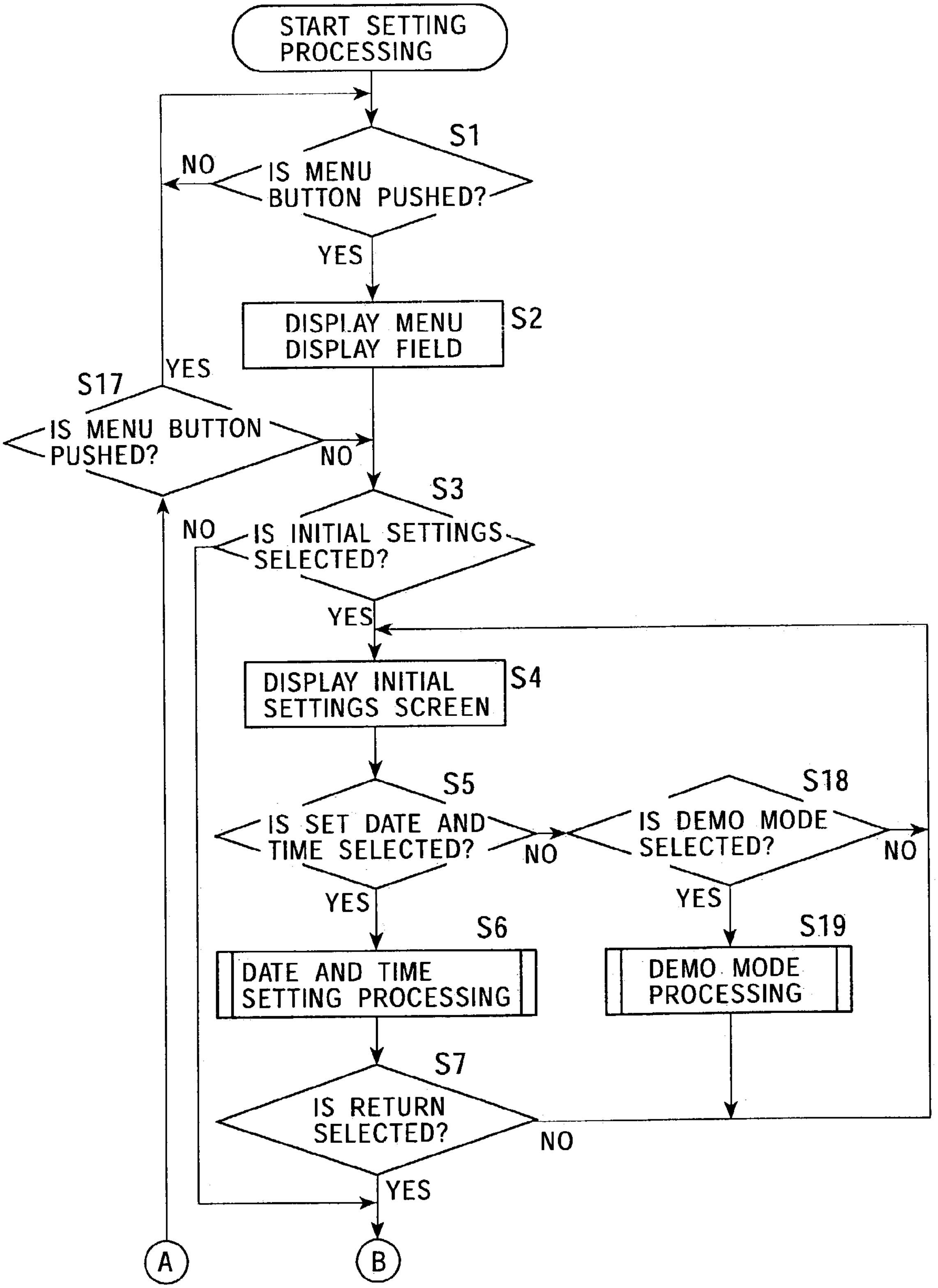
FIG. 4 is a flowchart for explaining setting processing.
Figure 5:
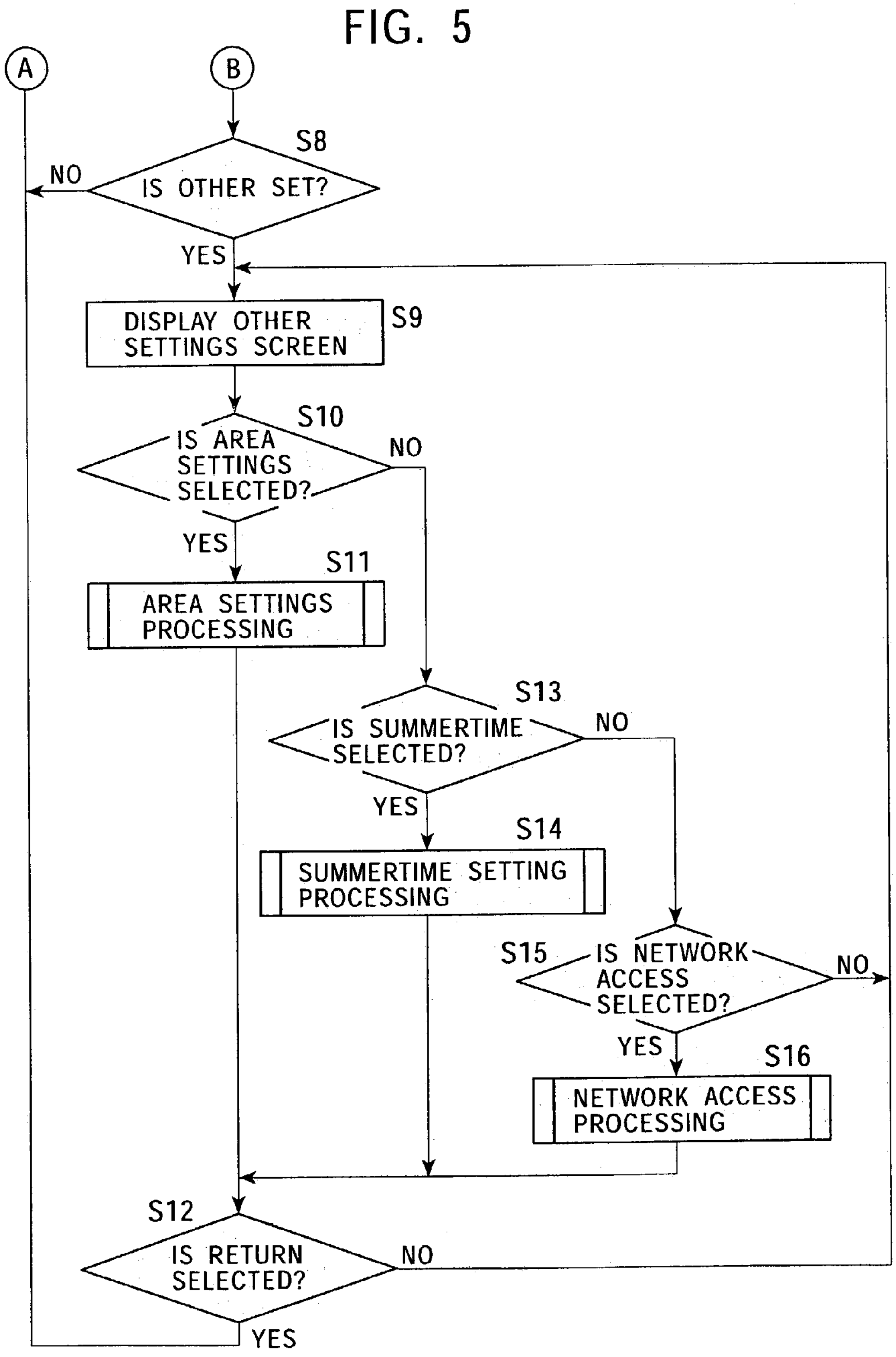
FIG. 5 is a flowchart for explaining setting processing.

Here we return to the description of the flowchart in FIGS. 4 and 5.

In step S7, the microcomputer 24 determines whether or not a return display field 101*b* is selected; if it determines that the return display field 101*b* is not selected, the processing returns to step S4 and if it determines that the return display field 101*b* is selected, the processing proceeds to step S8.

In step S8 (FIG. 5), the microcomputer 24 determines whether or not the jog-dial 14 is operated to move the cursor to the position of OTHER from the menu display field 103 on the setting screen and whether it is selected (SET); if OTHER is selected, the processing proceeds to step S9.

Figure 22:
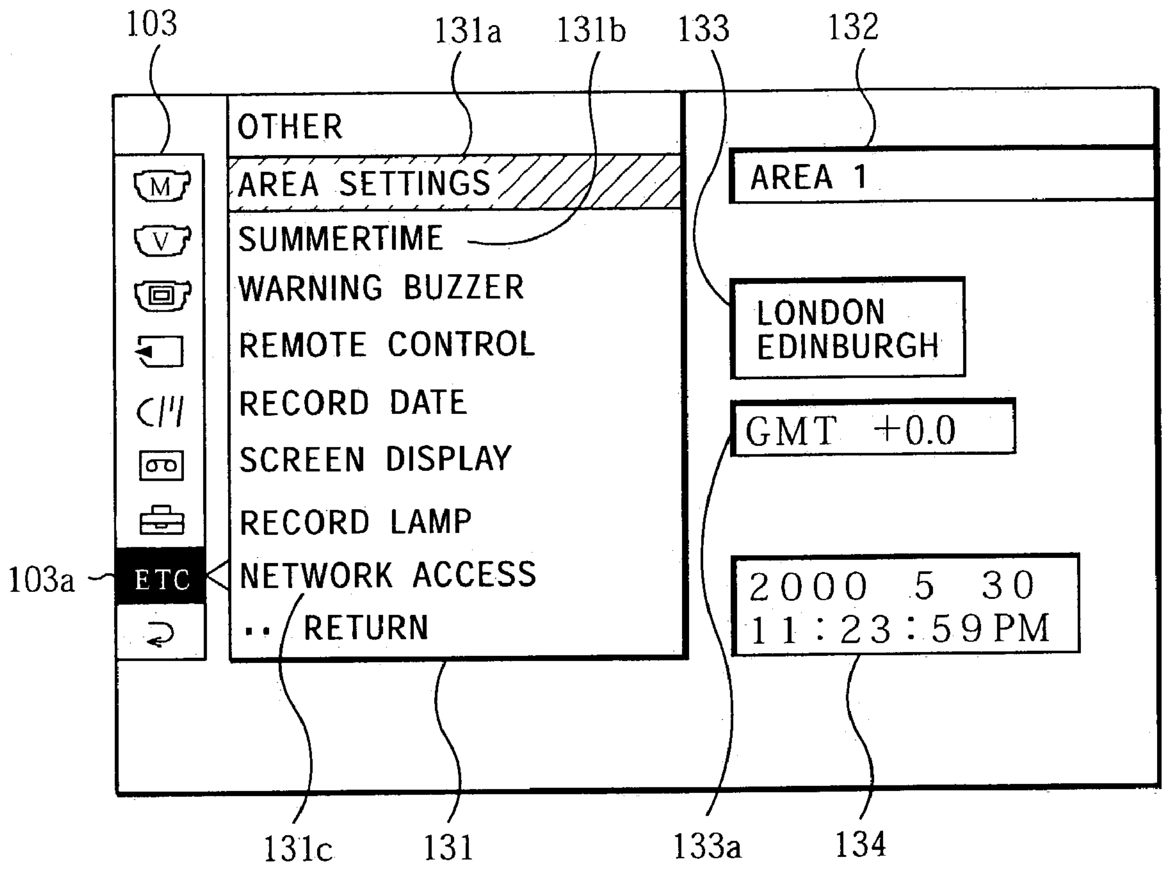
FIG. 22 is a drawing showing an example of a setting screen display which is displayed on the LCD in FIG. 1.

In step S9, the microcomputer controls the setting screen display control unit 22 to display the "OTHER" setting screen, as shown in FIG. 22. As shown in FIG. 22, an other settings list 131 is displayed on the "OTHER" setting screen, in which various setting items are displayed. In the present case, the icon indicating "OTHER" settings is the eighth icon from the top of the diagram of the menu display field 103. Also, an area setting display field 131*a*, a summertime setting display field 131*b*, a warning buzzer display field, a screen display display field, a record lamp display field, a network access display field 131*c*, and a return display field are displayed in the other settings list 131, from the top, and it is possible to select the processing for the various settings. Here, only the area setting, summertime setting, and network access processing, which are related to the time information, are described.

In step S10, the microcomputer 24 determines whether or not the area setting display field 131*a* is selected. For example, as shown in FIG. 22, if the area setting display field 131*a* is selected and set using the jog-dial 14, the processing proceeds to step S11. In step S11, area setting processing is executed. This area setting processing is the same processing as described with reference to the flowchart in FIG. 8, however, since the display screen is different, a description of that processing is omitted and the display screen is described.

As shown in FIG. 22, if the area setting display field 131*a* is highlighted using the jog-dial 14, an area number display field 132 is displayed at the upper right of the screen, where, in the present case, "Area 1" is displayed. Below that, an area display field 133 is displayed, which in the present case displays "London, Edinburgh". Below that, a GMT time-difference display field 133*a* is displayed, which, in conjunction with the area display field 133, displays the corresponding time difference with respect to World Standard Time. In the present case, "GMT +0.0" is displayed, which indicates that there is no time difference with respect to World Standard Time. Also, below that, a date and time display field 134 is displayed, in which is displayed the date and time set in the date and time setting processing in the initial settings. In the present case, it is shown in the date and time display field 134 that the current time is "30 May, 2000, 11:23:59 PM".

Figure 23:
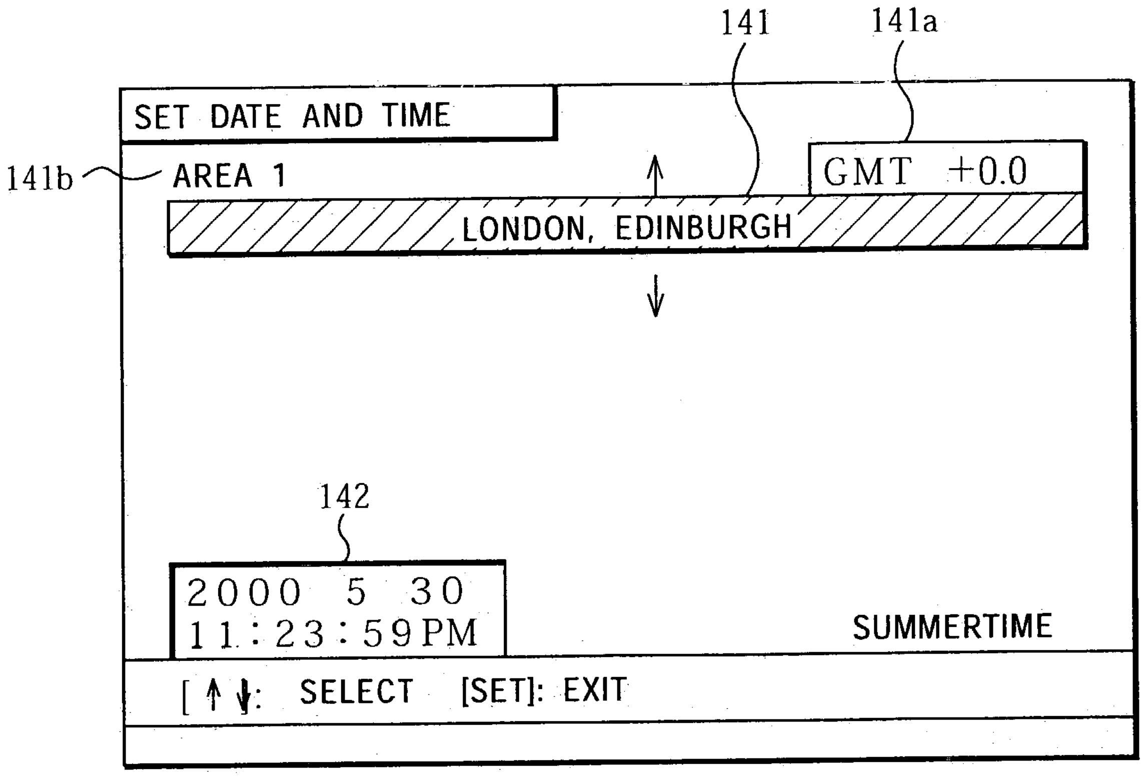
FIG. 23 is a drawing showing an example of a setting screen display which is displayed on the LCD in FIG. 1.

If SET is input in this state using the jog-dial 14, in other words, if the area setting display field 131*a* is selected, as shown in FIG. 23, an area selection field 141 is displayed, to the upper right thereof, a GMT time-difference display field 141*a* is displayed, and to the upper left thereof an area-number display field 141*b* is displayed. These correspond to the area selection field 111, the area-number display field 111*a*, and the GMT time-difference display field 112 of FIG. 8, respectively. Moreover, a date and time display field 142 is displayed to the lower left of the area selection field 141, and this corresponds to the date and time display field in FIG. 8.

In the present case, "London, Edinburgh" is displayed in the area selection field 141, "GMT +0.0" is displayed in the GMT time-difference display field 141*a*, "Area 1" is displayed in the area-number display field 141*b*, and "30 May, 2000, 11:23:59 PM" is displayed in the date and time display field 142. The difference from when the initial settings are carried out is that this processing is carried out without stopping the time counter, and right down to the seconds unit is displayed in the date and time display field 142. In other words, based on the time set when the initial settings were made, when, for example, going away on overseas travel with the video camera 1, by changing only the area setting and without stopping the time counter, it impossible to set the camera to the time zone for the country traveled to.

Figure 24:
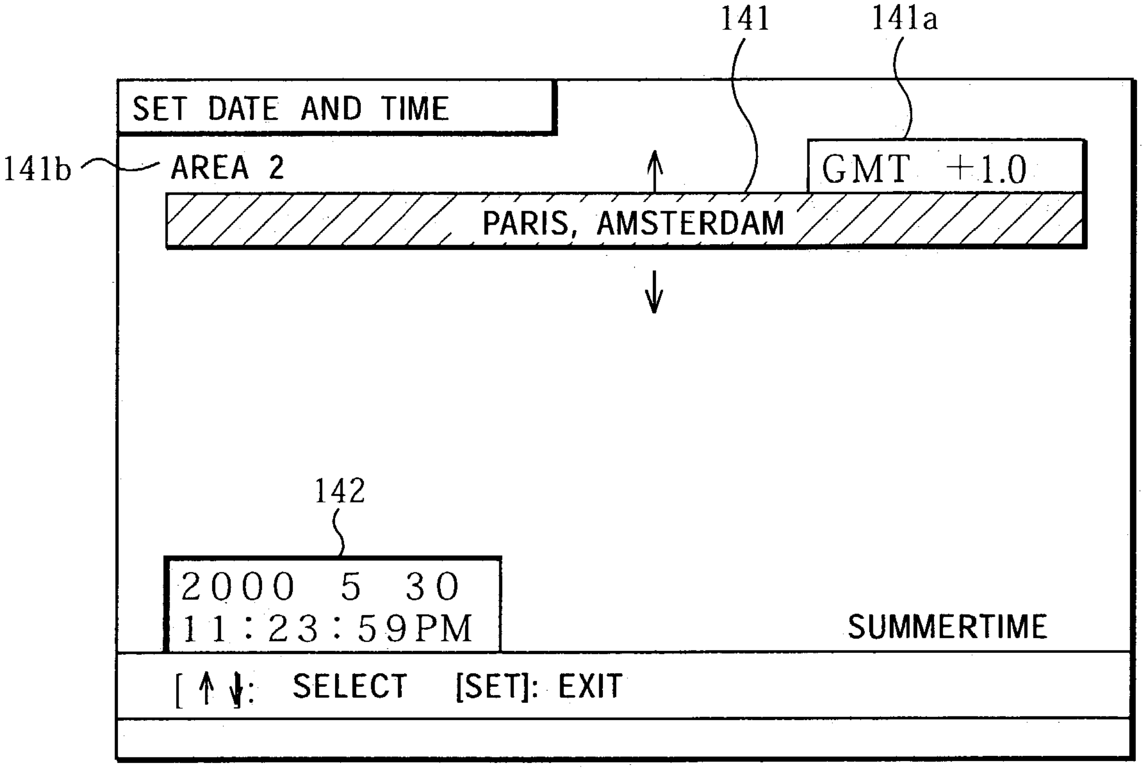
FIG. 24 is a drawing showing an example of a setting screen display which is displayed on the LCD in FIG. 1.
Figure 25:
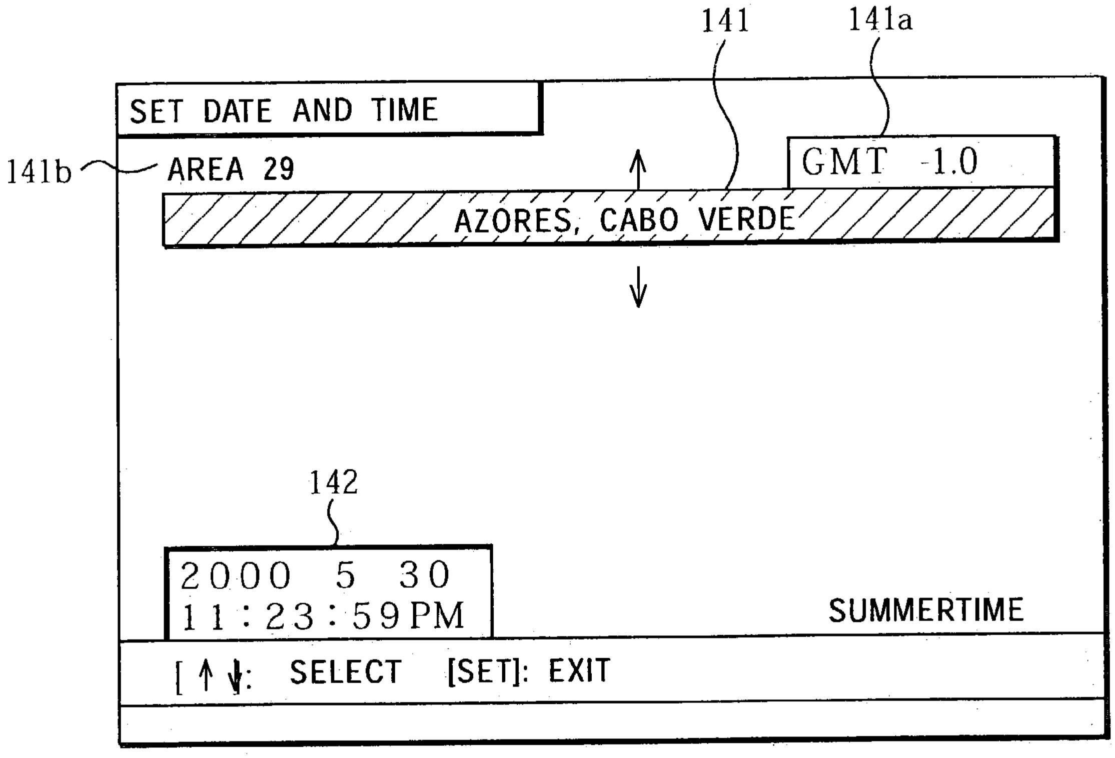
FIG. 25 is a drawing showing an example of a setting screen display which is displayed on the LCD in FIG. 1.

Since the area display field 141 is the only part which can be set on the display screen in FIG. 23, only the area display field 141 is displayed as highlighted. In this state, if, for example, the jog-dial 14 is rotated in the up direction (in the direction of arrow C in FIG. 2) by a corresponding angle for incrementing the area number by 1, as shown in FIG. 24, the display in the area selection field 141 is changed to display "Paris, Amsterdam", and furthermore, "GMT +1.0" is displayed in the GMT time-difference display field 141*a*, which indicates that there is a +1 hour time difference, the display in the date and time display field 142 indicates, by carrying out processing corresponding to this time difference, "31 May, 2000, 12:23:59 PM". In other words, when taking this video camera to Paris, for example, after performing date and time setting, using the initial settings, in London, by carrying out this processing, it is possible to change it to the date and time display corresponding to the time difference without performing date and time setting using the initial settings. Moreover, if it is rotated by an angle corresponding to that for incrementing the area number by −1, as shown in FIG. 25, the display in the area selection field 141 is changed to display "Azores, Cabo Verde", and furthermore, "GMT −1.0" is displayed in the GMT time-difference display field 141*a*, which indicates that there is a −1.0 hour time difference, and the display in the date and time display field indicates, by carrying out processing corresponding to this time difference, "May 30, 2000, 10:23:59 PM". In other words, when taking this video camera to the Azores, for example, after performing date and time setting, using the initial settings, in London, by carrying out this processing, it is possible to change it to the date and time display corresponding to the time difference without performing date and time setting using the initial settings.

Here we return to the description of the flowchart in FIGS. 4 and 5.

In step S12 (FIG. 5), it is determined whether or not RETURN is selected and if, for example, RETURN is not selected, the processing returns to step S9.

If the area setting display field 131*a* is not selected in step S10, in step S13, it is determined whether or not the summertime display field 131*b* is selected, and if it is determined that the summertime display field 131*b* is selected, after executing summertime setting processing in step S14, the processing proceeds to step S12. This summertime setting processing is the same as the processing that was described with reference to the flowchart in FIG. 12; however, since the display screen is different, that processing is omitted and the display screen is described.

Figure 26:
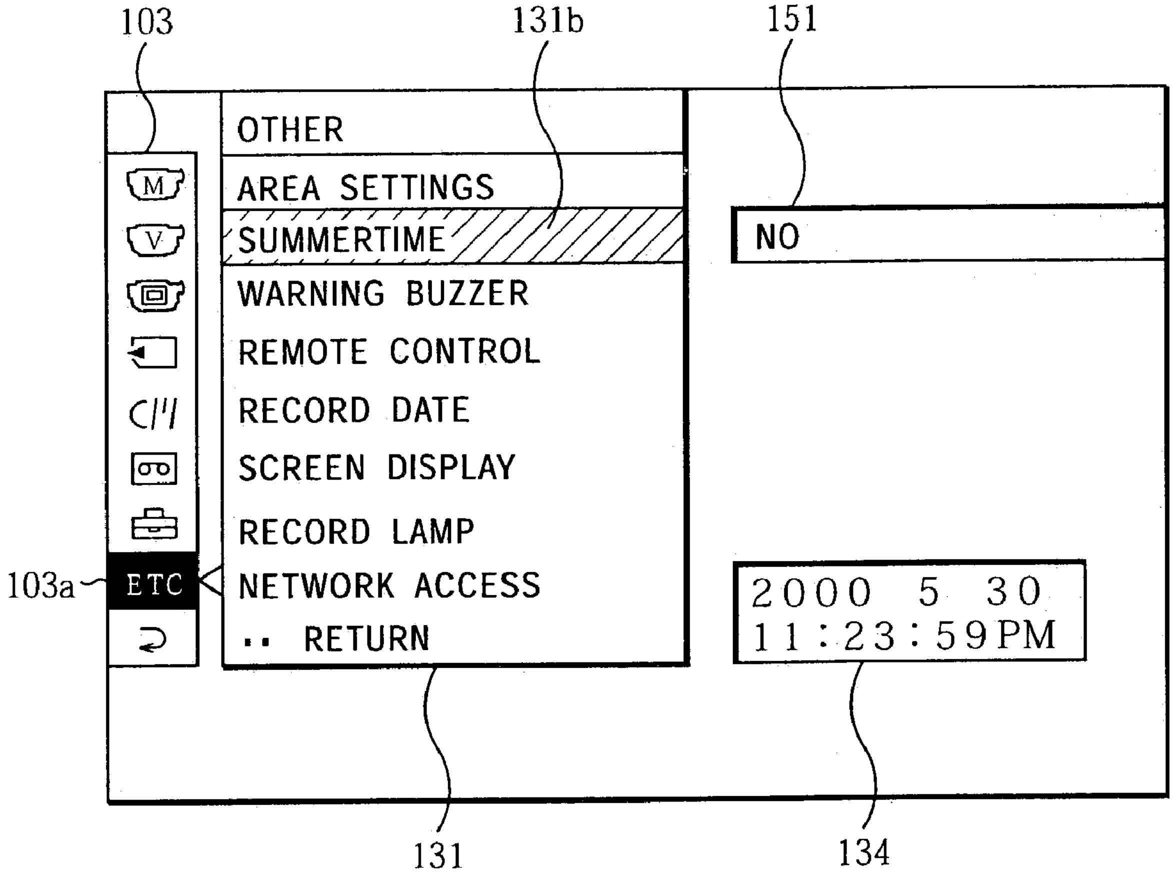
FIG. 26 is a drawing showing an example of a setting screen display which is displayed on the LCD in FIG. 1.
Figure 27:
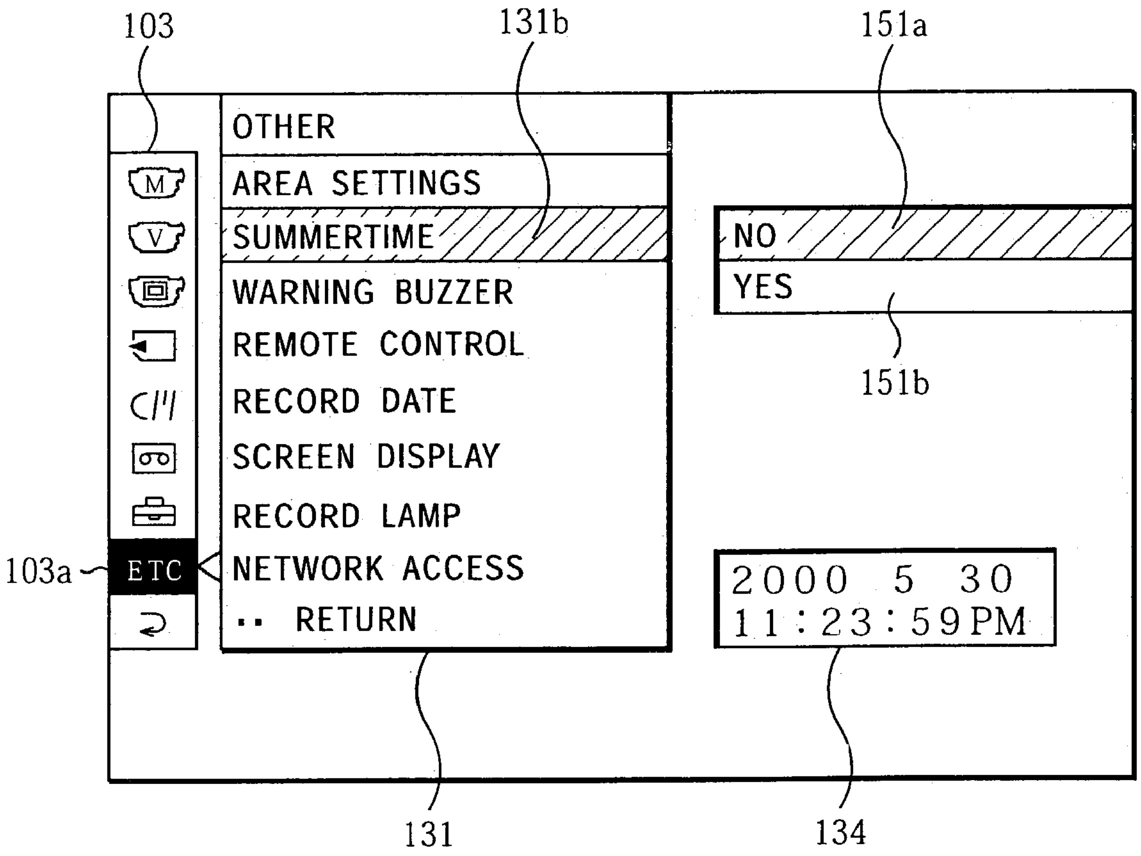
FIG. 27 is a drawing showing an example of a setting screen display which is displayed on the LCD in FIG. 1.
Figure 28:
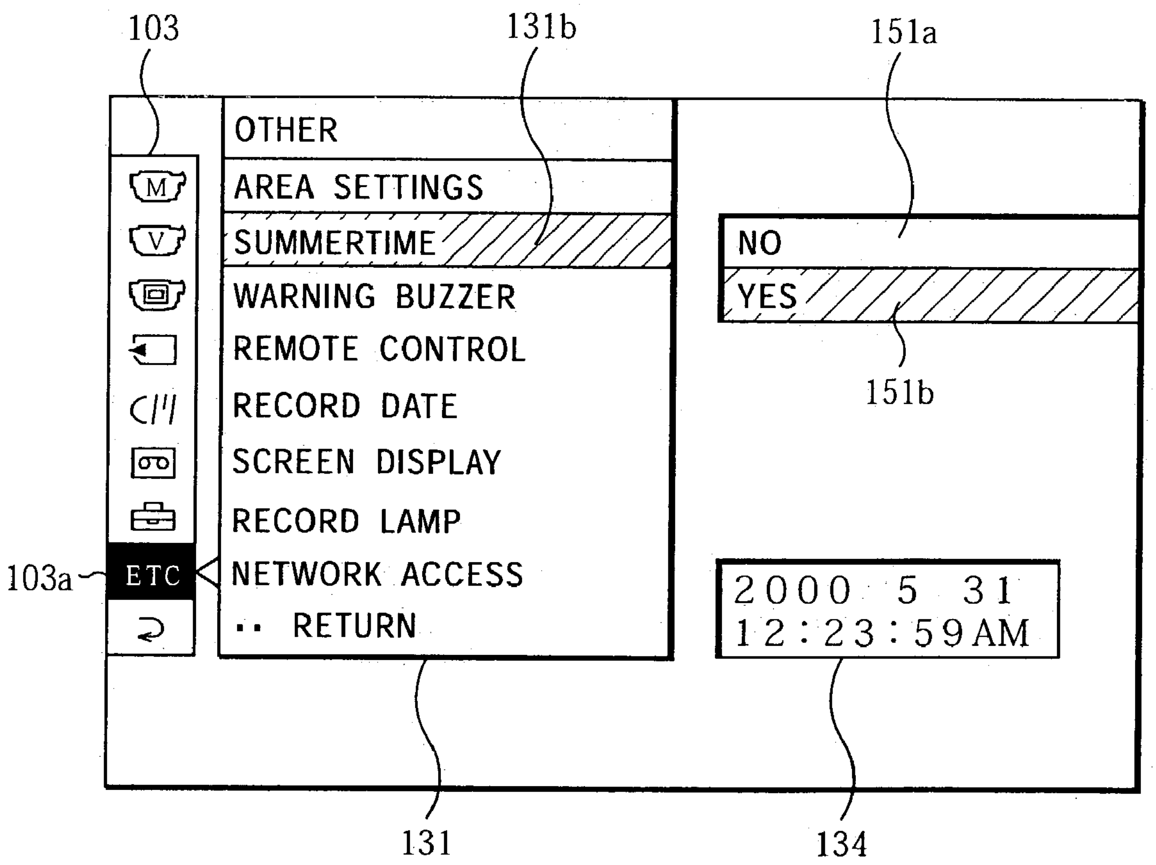
FIG. 28 is a drawing showing an example of a setting screen display which is displayed on the LCD in FIG. 1.
Figure 29:
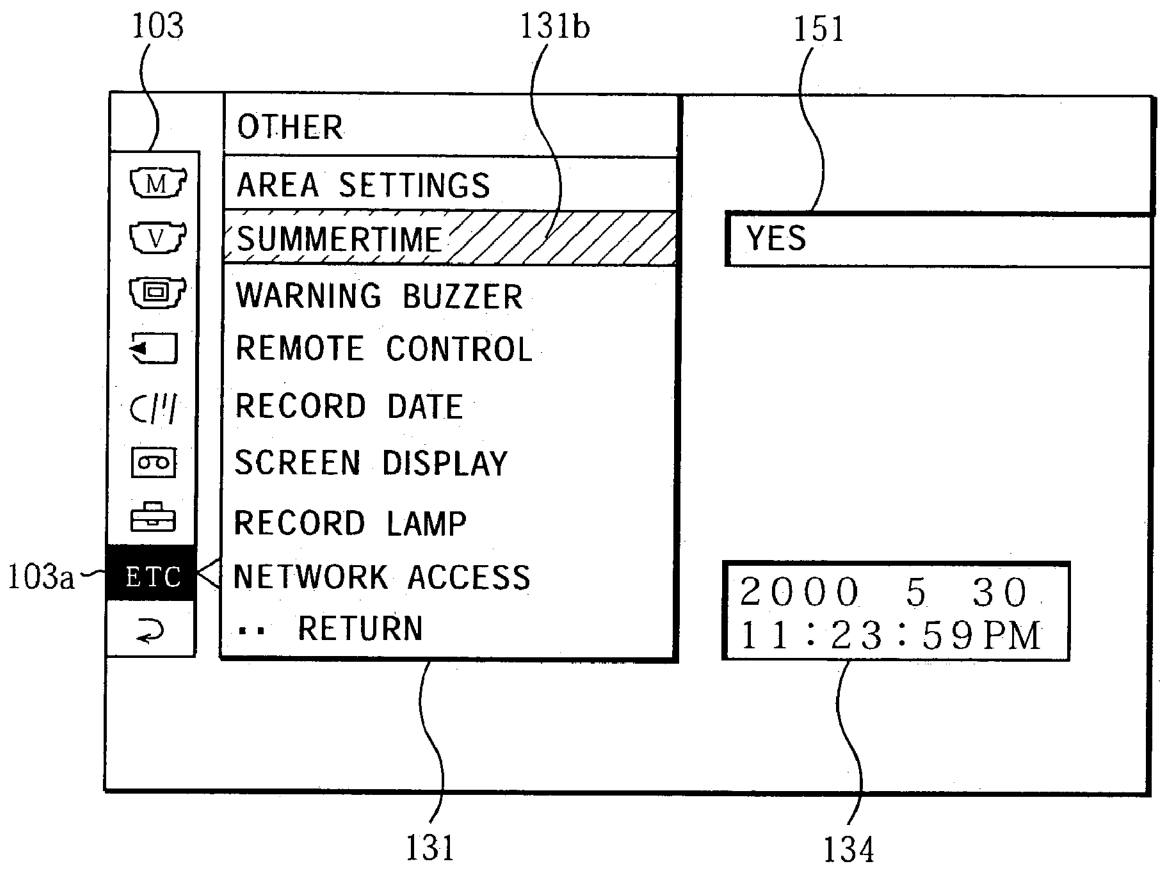
FIG. 29 is a drawing showing an example of a setting screen display which is displayed on the LCD in FIG. 1.

As shown in FIG. 26, the summertime display field 131*b* is highlighted using the jog-dial 14, and a summertime selection field 151 is displayed at the right of the display screen, in which the current summertime setting is displayed. In this state, if the jog-dial 14 is pressed in the direction of the arrow E in FIG. 2, as shown in FIG. 27, the summertime selection field 151 changes to display a summertime selection field 151*a*, in which "No" is displayed, and a summertime selection field 151*b*, in which "Yes" is displayed, and highlighting is used for indicating that summertime setting is possible. In the present case, the summertime selection field 151*a*, in which "No" is displayed, is highlighted. If the jog-dial 14 is rotated in this state in the direction of arrow C or in the direction of arrow D in FIG. 2, as shown in FIG. 28, the summertime selection field 151*b*, in which "Yes" is displayed, is highlighted. At this time, since summertime is set, in FIG. 27, a display indicating "May 30, 2000, 11:23:59 PM" appears in the date and time display field 134; however, due to the fact that summertime is set, as shown in FIG. 28, the display in the date and time display field 134 is changed to that indicating "May 31, 2000, 12:23:59 AM". If the jog-dial 14 is pressed in this state in the direction of arrow E in FIG. 2, in other words, if the summertime selection field 151*b* in which "Yes" is displayed is selected, as shown in FIG. 29, the fact that summertime is in effect is set.

Here we return to the description of the flowchart in FIGS. 4 and 5.

Figure 30:
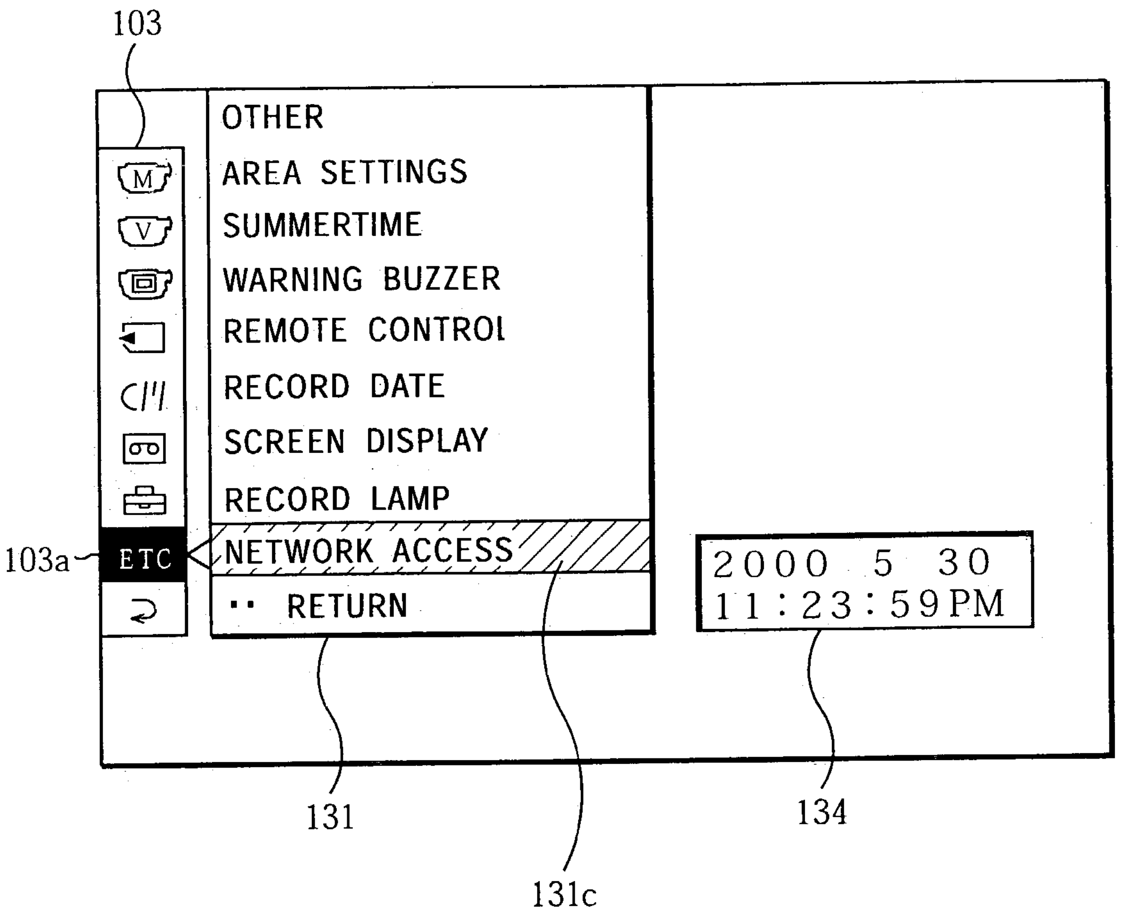
FIG. 30 is a drawing showing an example of a setting screen display which is displayed on the LCD in FIG. 1.

When the summertime setting display 131*b* is not selected in step S13 (FIG. 5), in step S15, it is determined whether or not network access is selected. In step S15, as shown, for example, in FIG. 30, if a network access display field 131*c* is highlighted using the jog-dial 14, then network access processing is executed in step S16.

Here, the network access processing is described with reference to the flowchart in FIG. 31.

Figure 32:
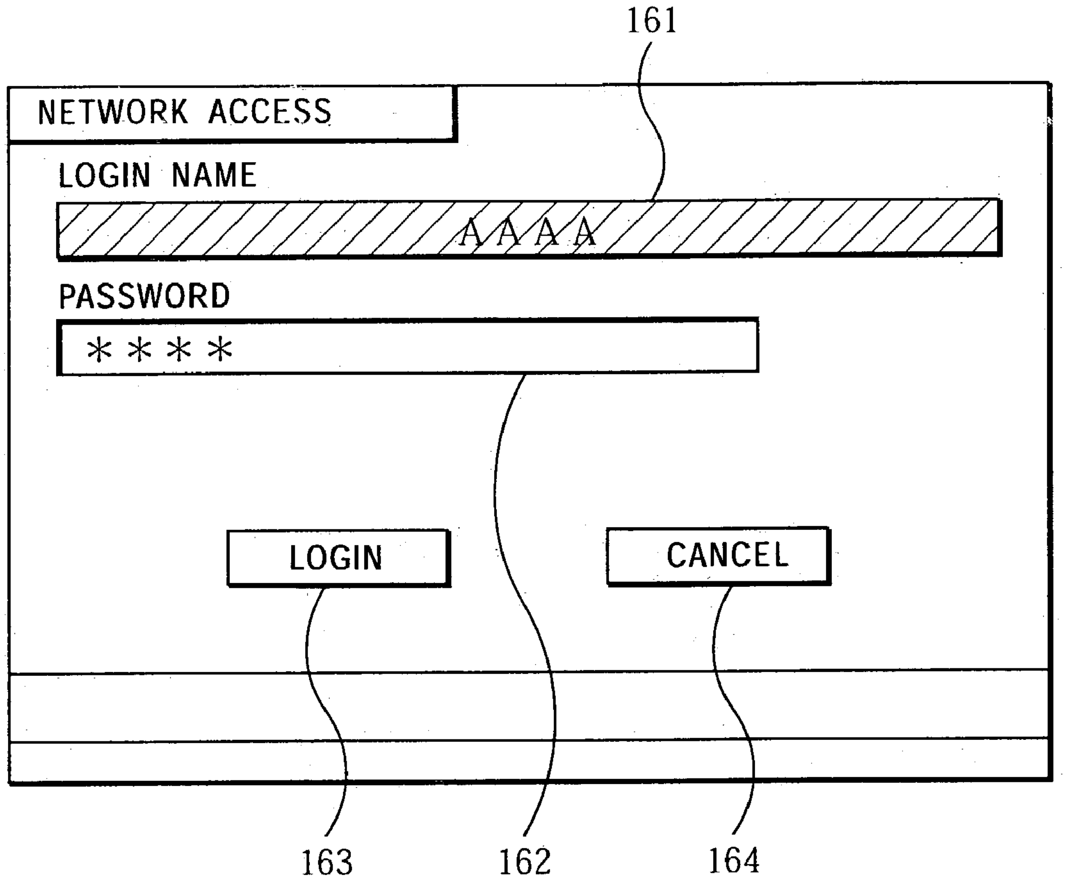
FIG. 32 is a drawing showing an example of a setting screen display which is displayed on the LCD in FIG. 1.

In step S81, the microcomputer 24 starts up a network access program 26*c* and, as shown in FIG. 32, displays a network access processing display screen on the LCD 13. A login name input field 161 is displayed at the upper portion of the display screen and, while highlighted, it is possible to input the characters of a login name using the jog-dial 14 or other buttons that are not shown in the figure. A password input field 162 is provided below the login name input field 161, and it is possible to input a password using the jog-dial 14 or other buttons that are not shown in the figure. A login button 163 is provided below the password input field 162, at the left, and when the user requests login, he or she can select it and press it using the jog-dial 14. A cancel button 164 is provided below the password input field 162, at the right, and when the user wants to cancel the processing, he or she can operate the jog-dial 14 to select it and press it. When the login name input field 161, the password input field 162, the login button 163, and the cancel button 164 are selected using the jog-dial 14, they are highlighted and input becomes possible.

In step S82, the network access program 26*c* determines whether or not there was a login request. For example, if it is determined that a predetermined login name and password are input into the login name input field 161 and the password input field 162 and the login button 163 is pressed, the processing proceeds to step S83.

Figure 33:
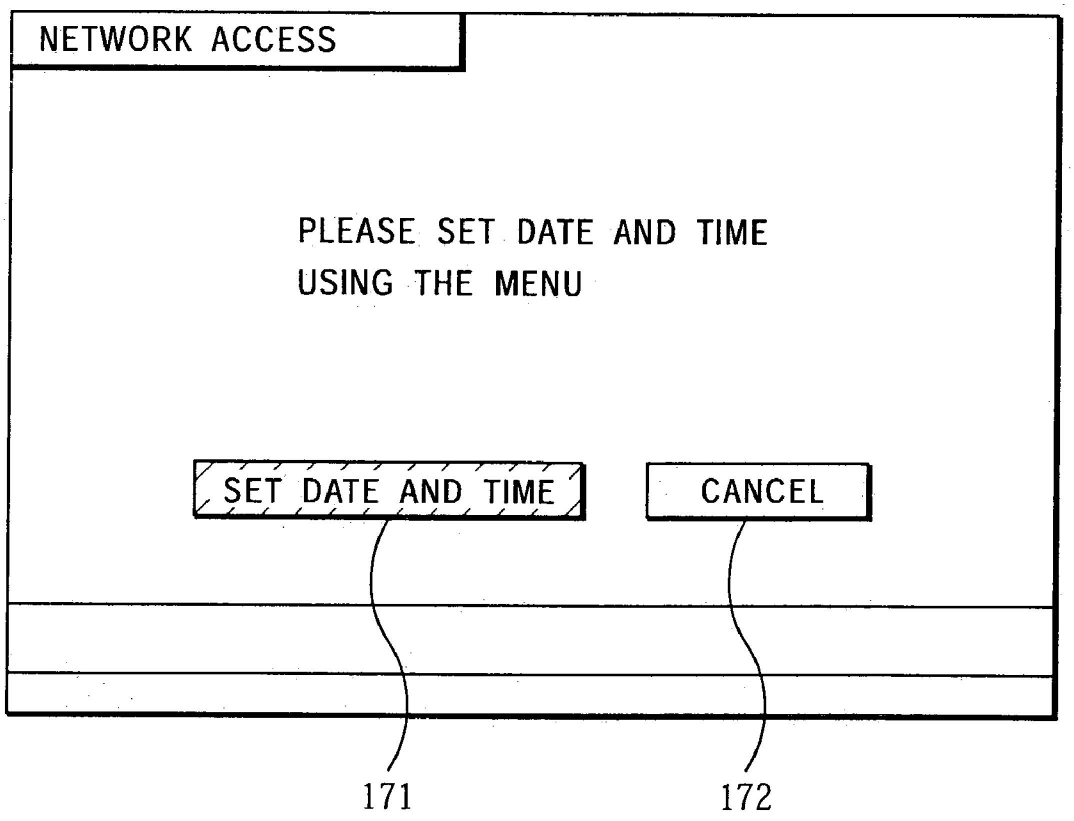
FIG. 33 is a drawing showing an example of a setting screen display which is displayed on the LCD in FIG. 1.

In step S83, the network access program 26*c* determines whether or not the date and time are set. In more detail, the network access program 26*c* determines whether or not settings information (area information (time difference) and information indicating whether or not summertime is in effect) is recorded in the RAM 24*c* in the microcomputer 24. If it is determined in step S83, for example, that the date and time are not set, in step S84, the network access program 26*c* displays a screen requesting that the date and time be set, as shown in FIG. 33. That is to say, at the center of the screen in FIG. 33, "Please set the date and time using the menu" is displayed and, below that, a set date and time button 171, indicating "Set date and time", and a cancel button 172 are displayed.

In step S85, the network access program 26*c* determines whether or not the set date and time button 171 is pressed, and if it is determined that the set date and time button 171 is pressed, the date and time setting processing is executed in step S86. The date and time setting processing in step S86 is the same as the processing described above with reference to the flowchart in FIG. 7, and thus a description thereof is omitted.

In step S87, the network access program 26*c* executes a GMT program 26*b* on the basis of area information (time difference) stored in the RAM 24*c*, information indicating whether or not summertime is in effect, and information in the real-time clock 25, and, after calculating World Standard Time, it controls the communication unit 29 to transmit to the server 32 via the Internet 31 the input login name and password, as authentication information, and receives a response from the server 32.

In other words, the GMT program 26*b* adds a value for the time difference to the current time set in the real-time clock 25 and then it obtains World Standard Time from the information indicating whether or not summertime is in effect.

Also, at this time, when authentication, as well as the authentication result, are received from the server 32, menu information for programs that can be executed is transmitted by the server 32 via the Internet 31.

Figure 34:
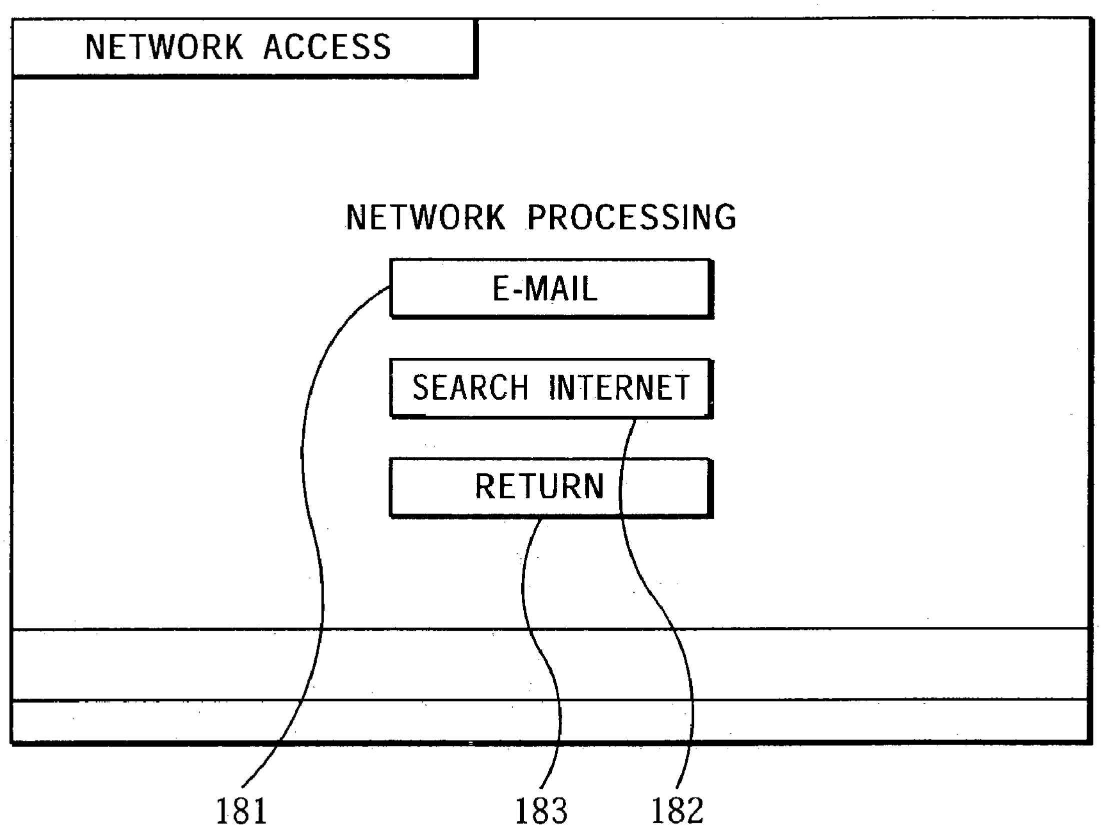
FIG. 34 is a drawing showing an example of a setting screen display which is displayed on the LCD in FIG. 1.

In step S88, the network access program 26*c* determines whether or not the authentication result from the server is confirmed, and if it is determined that authentication is confirmed, in step S90, it displays the network processing menu screen in FIG. 34 based on the menu information received from the server 32. That is to say, on the network processing menu screen shown in FIG. 34, a mail button 181, an Internet search button 182, and a return button 183 are displayed. If the mail button 181 is selected and pressed using the jog-dial 14, a mail program is executed. If the Internet search button 182 is pressed using the jog-dial 14, an Internet search engine program is executed. If the return button 183 is pressed using the jog-dial 14, the network access processing is terminated.

In step S90, the various types of processing executed by pressing the mail button 181 and the Internet search button 182 are executed as network processing. The network processing may also include processing other than the above-mentioned mail and Internet searching.

In step S91, the network access program 26*c* determines whether or not the return button 183 is pressed, and that processing is repeated until it is pressed; if it is determined that it is pressed, the processing is terminated and the processing then returns to step S12 in FIG. 5.

If there is no login request in step S82, in other words, if the cancel button 164 is pressed, the processing proceeds to step S12 in FIG. 5. If it is determined in step S83 that the date and time are set the processing from steps S4 to S6 skipped and the processing proceeds to step S8. If the set date and time button 171 is not pressed in step S85, in other words, if the cancel button 172 is pressed, the processing proceeds to step S12 in FIG. 5. If authentication is not confirmed in step S88, the processing returns to step S81, and the processing thereafter is repeated.

Here we return to the description of the flowchart in FIGS. 4 and 5.

If it is determined in step S3 that initial settings is not selected, the processing in steps S4 to S7 is skipped, and the processing proceeds to step S8. If it is determined in step S5 that set date and time is not selected, in step S18, it is determined whether or not a demo mode is selected, and if it is determined that the demo mode is selected, in step S19, demo mode processing is executed and then the processing returns to step S4. Demo mode processing means that a demonstration of the operations is displayed; however, the description of that processing is omitted here. If the demo mode is not selected in step S18, the processing returns to step S4. Also, if return is not selected in step S7, the processing returns to step S4. If other is not selected in step S8, in step S17, it is determined whether or not the menu button 16 is pressed, and if the menu button 16 is pressed, the processing returns to step S1, whereas if the menu button 16 is not pressed, the processing returns to step S3.

If return is selected in step S12, the processing proceeds to step S17. If network access is not selected in step S15, the processing returns to step S9.

Therefore, in the video camera 1 employing the present invention, when performing transmission and reception of data with the server 32 via a network such as the Internet 31, since it is possible to calculate World Standard Time information, which is required together with authentication information, from time difference information for each area, information indicating whether or not summertime is in effect, and current time information which is set, by transmitting it at access time together with the authentication information to the server 32 or the like, it is possible for the video camera 1 itself to transmit and receive data recorded in the VTR unit 30 or the like directly with the server 32.

Figure 35:
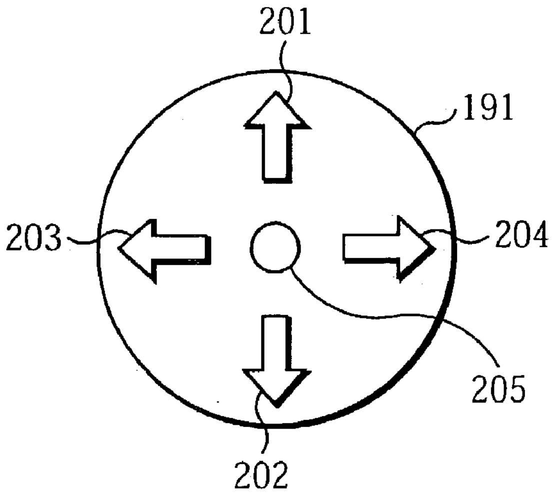
FIG. 35 is a drawing showing a selection button which is used in place of the jog-dial in FIG. 1.

In the embodiment described above, various information is input using the jog-dial 14, for the input unit 28. However, other input devices may also be used; for example, a selection button 191, as shown in FIG. 35, may be provided in the casing 15. This selection button 191 is formed of an up button 201, a down button 202, a left button 203, a right button 204, and a set button 205, and in various kinds of processing, in the same way as with the jog-dial 14, in addition to up/down information, it is possible to input left/right information and setting information.

According to the above, since a video camera can calculate World Standard Time from the current time, based on time-difference information for each area and information indicating whether or not summertime is in effect, by using the calculated World Standard Time information, it is possible to access a server directly via a network, thus making it possible for the video camera itself to transmit and receive data directly with the server.

The series of processes described above may also be implemented in hardware; however they may also be implemented in software. If the series of processes is implemented in software, the program constituting that software is installed from a recording medium into a computer with integrated dedicated hardware or into a computer which is capable of executing various functions by installing various programs, such as, for example, a general-purpose personal computer or the like.

Figure 3:
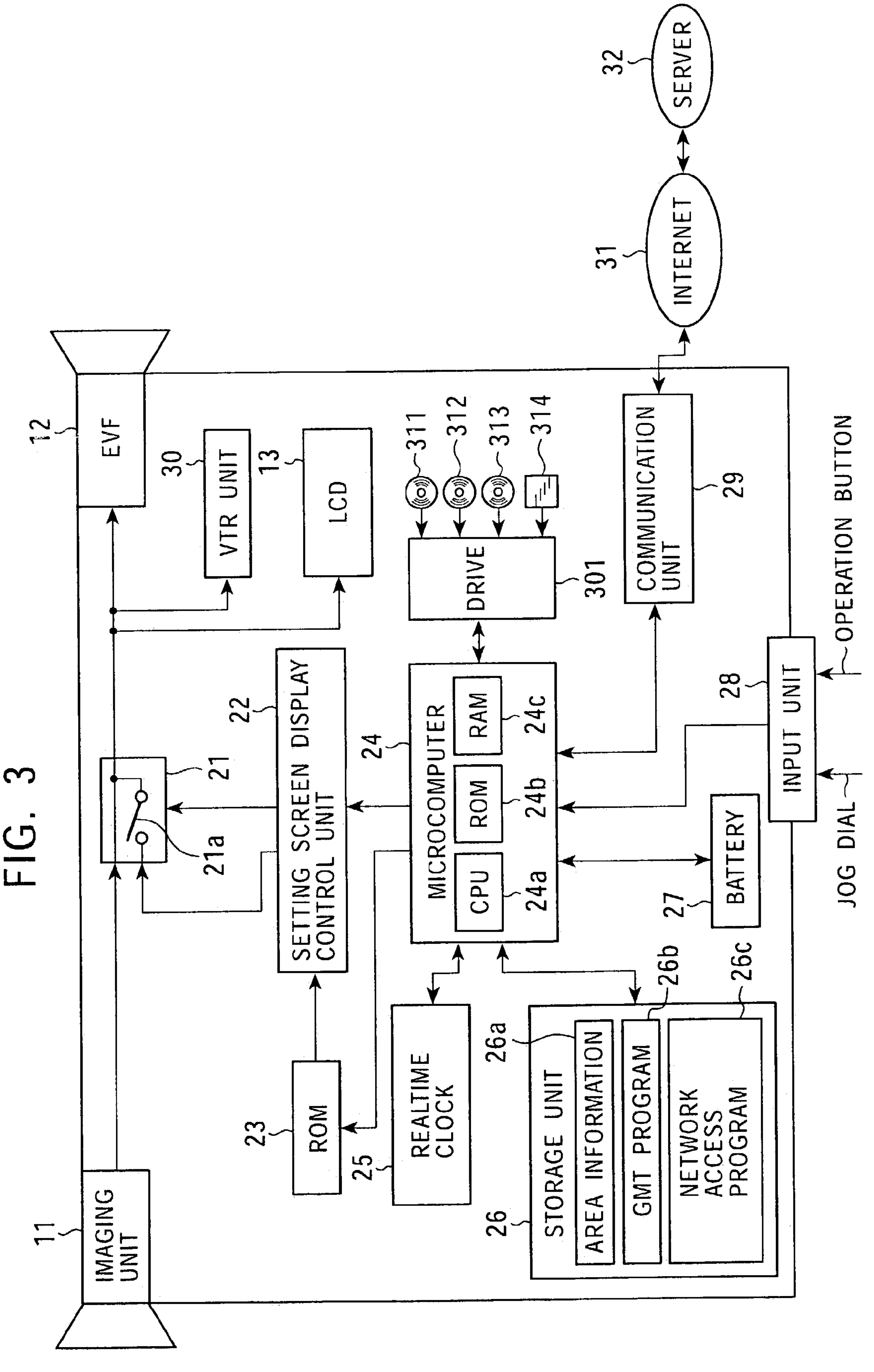
FIG. 3 is a view for explaining the electrical configuration of the video camera in FIG. 1.

This recording medium is not only the storage unit 26, in which a program is provided by the user when installed beforehand into the voice recognition apparatus 1 shown in FIG. 3, but, in addition to a computer, it is constituted of packaged media, such as the magnetic disk 311 (including a floppy disk), the optical disk 312 (including CD-ROM (Compact Disk-Read Only Memory) and DVD (Digital Versatile Disk)), the magneto-optical disk 313 (including MD (Mini-Disk)) or the semiconductor memory 314 (including Memory Stick), in which a program, distributed to users in order to provide programs, is recorded.

In this specification, in the steps describing the program recorded in the recording medium, the processing, which is carried out chronologically in the order mentioned, is of course not necessarily processed chronologically, but also includes processing which is executed in parallel or separately.

INDUSTRIAL APPLICABILITY

According to the present invention, an information processing apparatus that is provided with an imaging function can directly access a server and therefore it is possible to send and receive direct data.

The invention claimed is:

1. An information processing apparatus having an imaging function, comprising;

an input unit for inputting information due to user's operation;

time setting means for setting the time using said input unit;

time-difference relation information setting means for setting the time-difference relation information using said input unit;

world standard time calculating means for calculating said world standard time from the time set using said time setting means, the time-difference relation information set using said time-difference relation information setting means;

a display unit for displaying a screen;

a communication unit for transmitting data to an external device;

determining means for determining whether said time-difference relation information is set when accessing said external device through said communication unit; and control means for controlling said communication unit transmitting said world standard time calculated by said world standard time calculating means to said external device when said time-difference relation information is set due to determination of said determining means, controlling said display requesting that the date and time be set when said time-difference relation information is not set due to determination of said determining means.

2. The information processing apparatus according to claim 1, further comprising:

area storage means for storing in advance a plurality of said areas, wherein, said area setting means sets an area, input using said input means, from among the areas stored in advance in said area storage means.

3. The information processing apparatus according to claim 2, wherein: said area storage means further stores time-difference information, with respect to said world standard time, for each of said plurality of areas; and said world standard time calculating means calculates said world standard time from the time set using said time setting means, the time-difference information, with respect to the world standard time, for the area input and set using said input means from among the areas stored in advance by said area storage means, and said information indicating whether or not summertime is in effect, which is set using said summertime information setting means.

4. The information processing apparatus according to claim 1, further comprising:

accessing means for accessing another information processing apparatus via a network;

wherein, when accessing said other information processing apparatus via said network, at that time, said accessing means transmits to said other information processing apparatus said world standard time information calculated by said world standard time calculating means.

5. The information processing apparatus according to claim 1, wherein said input unit is formed of a rotary/pushbutton operating element.

6. A video camera comprising the information processing apparatus according to claim 1.

7. The information processing apparatus according to claim 1, wherein said time-difference relation information consists of area information and summertime information.

8. An information processing method for an information processing apparatus having an imaging function, said information processing method comprising:

an inputting step for inputting information due to user's operation;

a time setting step of setting the time using said inputting step;

a time-difference relation information setting step for setting the time-difference relation information using said inputting step;

a world standard time calculating step of calculating said world standard time from the time set by the processing of said time setting step, the time-difference relation information set using said time-difference relation information setting step;

a display step for displaying on a screen;

a communication step for transmitting data to an external device;

a determining step for determining whether said time-difference relation information is set when accessing said external device through said communication step; and a control step for controlling said communication step transmitting said world standard time calculated by said world standard time calculating step to said external device when said time-difference relation information is set due to determination of said determining step, controlling said display requesting that the date and time be set when said time-difference relation information is not set due to determination of said determining step.

9. A computer readable medium for storing a program for controlling an information processing apparatus having an imaging function, the program comprising: an inputting step for inputting information due to user's operation;

a time setting control step of controlling the setting of the time using said inputting step;

a time-difference relation information setting step for setting the time-difference relation information using said inputting step;

a world standard time calculating control step of controlling the calculation of said world standard time from the time set by the processing of said time setting control step, the time-difference relation information set using said time-difference relation information setting step;

a display step for displaying on a screen;

a communication step for transmitting data to an external device;

a determining step for determining whether said time-difference relation information is set when accessing said external device through said communication step; and a control step for controlling said communication step transmitting said world standard time calculated by said world standard time calculating step to said external device when said time-difference relation information is set due to determination of said determining step, controlling said display requesting that the date and time be set when said time-difference relation information is not set due to determination of said determining step.

10. A computer readable medium for storing a program for controlling an information processing system having an imaging function, for executing:

an inputting step for inputting information due to user's operation;

a time setting control step of controlling the setting of the time using said inputting step;

a time-difference relation information setting step for setting the time-difference relation information using said inputting step;

a world standard time calculating control step of controlling the calculation of said world standard time from the time set by the processing of said time setting control step, the time-difference relation information set using said time-difference relation information setting step;

a display step for displaying on a screen;

a communication step for transmitting data to an external device;

a determining step for determining whether said time-difference relation information is set when accessing said external device through said communication step; and a control step for controlling said communication step transmitting said world standard time calculated by said world standard time calculating step to said external device when said time-difference relation information is set due to determination of said determining step, controlling said display requesting that the date and time be set when said time-difference relation information is not set due to determination of said determining step.

* * * * *